(12) United States Patent
Ying et al.

(10) Patent No.: US 12,507,217 B2
(45) Date of Patent: Dec. 23, 2025

(54) USER EQUIPMENTS, BASE STATIONS AND SIGNALING FOR UPLINK SUPPORT OF REDUCED CAPABILITY NEW RADIO DEVICES

(71) Applicant: SHARP KABUSHIKI KAISHA, Sakai (JP)

(72) Inventors: Kai Ying, Vancouver, WA (US); Tatsushi Aiba, Sakai (JP); Zhanping Yin, Vancouver, WA (US); John Michael Kowalski, Vancouver, WA (US); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 383 days.

(21) Appl. No.: 17/924,924

(22) PCT Filed: May 12, 2021

(86) PCT No.: PCT/JP2021/018081
§ 371 (c)(1),
(2) Date: Nov. 11, 2022

(87) PCT Pub. No.: WO2021/230296
PCT Pub. Date: Nov. 18, 2021

(65) Prior Publication Data
US 2023/0209511 A1      Jun. 29, 2023

Related U.S. Application Data

(60) Provisional application No. 63/025,057, filed on May 14, 2020.

(51) Int. Cl.
*H04W 72/0446* (2023.01)
*H04L 1/00* (2006.01)
(Continued)

(52) U.S. Cl.
CPC ....... *H04W 72/0446* (2013.01); *H04L 1/0003* (2013.01); *H04W 72/23* (2023.01); *H04W 76/20* (2018.02)

(58) Field of Classification Search
CPC . H04W 72/0446; H04W 72/23; H04W 76/20; H04L 1/0003
See application file for complete search history.

(56) References Cited

U.S. PATENT DOCUMENTS

2013/0083753 A1    4/2013 Lee et al.
2017/0280481 A1*   9/2017 Stern-Berkowitz .......... H04L 1/1854
(Continued)

FOREIGN PATENT DOCUMENTS

CN    103999528 A    8/2014
CN    110167170 A    8/2019
(Continued)

OTHER PUBLICATIONS

Ericsson, "New SID on support of reduced capability NR devices", RP-193238, 3GPP TSG RAN Meeting #86, Sitges, Spain, Dec. 9-12, 2019.
(Continued)

*Primary Examiner* — Blake J Rubin
(74) *Attorney, Agent, or Firm* — ScienBiziP, P.C.

(57) ABSTRACT

A user equipment (UE) is described. The UE includes receiving circuitry configured to receive downlink control information (DCI) for uplink transmission with reduced capability. The DCI includes a time domain resource assignment field The UE also includes a processor. The processor is configured to determine a resource allocation based on the DCI with the time domain resource assignment field.

5 Claims, 19 Drawing Sheets

1900

Receive signaling that includes downlink control information (DCI) for uplink transmission with reduced capability, wherein the DCI includes a time domain resource assignment field — 1902

Determine a resource allocation based on the DCI with the time domain resource assignment field — 1904

(51) Int. Cl.
*H04W 72/23* (2023.01)
*H04W 76/20* (2018.01)

(56) References Cited

U.S. PATENT DOCUMENTS

| | | | |
|---|---|---|---|
| 2019/0159213 A1 | 5/2019 | Baldemair et al. | |
| 2019/0190644 A1 | 6/2019 | Ugurlu et al. | |
| 2020/0374875 A1 | 11/2020 | Li et al. | |
| 2020/0374911 A1 | 11/2020 | Lee et al. | |
| 2021/0345387 A1* | 11/2021 | Gurelli | H04L 5/0053 |
| 2021/0345388 A1* | 11/2021 | Huang | H04W 72/1273 |
| 2023/0031932 A1* | 2/2023 | Zheng | H04L 1/0072 |
| 2023/0038936 A1* | 2/2023 | Zheng | H04L 1/1854 |
| 2023/0079149 A1* | 3/2023 | Zheng | H04W 52/0219 370/329 |
| 2023/0147138 A1* | 5/2023 | Maki | H04W 72/0446 714/726 |
| 2023/0156752 A1* | 5/2023 | Tuong Tran | H04W 72/1273 370/329 |
| 2023/0179357 A1* | 6/2023 | Seo | H04L 1/00 370/329 |
| 2023/0209542 A1* | 6/2023 | Wang | H04L 5/0053 370/329 |
| 2023/0217498 A1* | 7/2023 | Lee | H04W 74/0833 370/329 |

FOREIGN PATENT DOCUMENTS

| | | |
|---|---|---|
| WO | 2019/160361 A1 | 8/2019 |
| WO | 2019/167028 A1 | 9/2019 |

OTHER PUBLICATIONS

3GPP TS 38.321 V15.8.0 (Dec. 2019) 3rd Generation Partnership Project; Technical Specification Group Radio Access Network; NR; Medium Access Control (MAC) protocol specification (Release 15).
3GPP TS 38.331 V15.8.0 (Dec. 2019) 3rd Generation Partnership Project; Technical Specification Group Radio Access Network; NR; Radio Resource Control (RRC) protocol specification (Release 15).
3GPP TS 38.211 V16.0.0 (Dec. 2019) 3rd Generation Partnership Project; Technical Specification Group Radio Access Network; NR; Physical channels and modulation (Release 16).
3GPP TS 38.212 V16.0.0 (Dec. 2019) 3rd Generation Partnership Project; Technical Specification Group Radio Access Network; NR; Multiplexing and channel coding (Release 16).
3GPP TS 38.214 V16.0.0 (Dec. 2019) 3rd Generation Partnership Project; Technical Specification Group Radio Access Network; NR; Physical layer procedures for data (Release 16).
3GPP TS 38.213 V16.0.0 (Dec. 2019) 3rd Generation Partnership Project; Technical Specification Group Radio Access Network; NR; Physical layer procedures for control (Release 16).

* cited by examiner

USER EQUIPMENTS, BASE STATIONS AND SIGNALING FOR UPLINK SUPPORT OF REDUCED CAPABILITY NEW RADIO DEVICES

TECHNICAL FIELD

The present disclosure relates generally to communication systems. More specifically, the present disclosure relates to user equipments, base stations and signaling for uplink support of reduced capability New Radio devices.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: receiving circuitry configured to receive a radio resource control (RRC) message comprising a time domain resource assignment table, the receiving circuitry configured to receive a RRC message comprising a modulation and coding scheme (MCS) table, the receiving circuitry configured to receive downlink control information (DCI) for an uplink transmission with reduced capability, wherein the DCI includes a time domain resource assignment field and a MCS field; and a processor configured to determine a resource allocation for the uplink transmission based on the DCI with the time domain resource assignment field and the time domain resource assignment table, the processor configured to determine a MCS for the uplink transmission based on the DCI with the MCS field and some of rows in the MCS table.

In one example, a base station (gNB), comprising: transmitting circuitry configured to transmit a radio resource control (RRC) message comprising a time domain resource assignment table, the transmitting circuitry configured to transmit a RRC message comprising a modulation and coding scheme (MCS) table, a processor configured to determine a resource allocation from the time domain resource assignment table and a MCS from some of rows in the MCS table for an uplink transmission of a user equipment (UE) with reduced capability; and transmitting circuitry configured to transmit, to the UE, downlink control information (DCI), wherein the DCI includes a time domain resource assignment field indicating the resource allocation for the uplink transmission and a MCS field indicating the MCS for the uplink transmission.

In one example, a method by a user equipment (UE), comprising: receiving a radio resource control (RRC) message comprising a time domain resource assignment table, receiving a RRC message comprising a modulation and coding scheme (MCS) table, receiving signaling that comprises downlink control information (DCI) for an uplink transmission with reduced capability, wherein the DCI includes a time domain resource assignment field and a MCS field; and determining a resource allocation for the uplink transmission based on the DCI with the time domain resource allocation field and the time domain resource assignment table, determining a MCS for the uplink transmission based on the DCI with the MCS field and some of rows in the MCS table.

In one example, a method by a base station (gNB), comprising: transmitting a radio resource control (RRC) message comprising a time domain resource assignment table, transmitting a RRC message comprising a modulation and coding scheme (MCS) table, determining a resource allocation from the time domain resource assignment table and a MCS from some of rows in the MCS table for an uplink transmission of a user equipment (UE) with reduced capability; and transmitting, to the UE, downlink control information (DCI), wherein the DCI includes a time domain resource assignment field indicating the resource allocation for the uplink transmission and a MCS field indicating the MCS for the uplink transmission.

DESCRIPTION OF EMBODIMENTS

Figure 1:
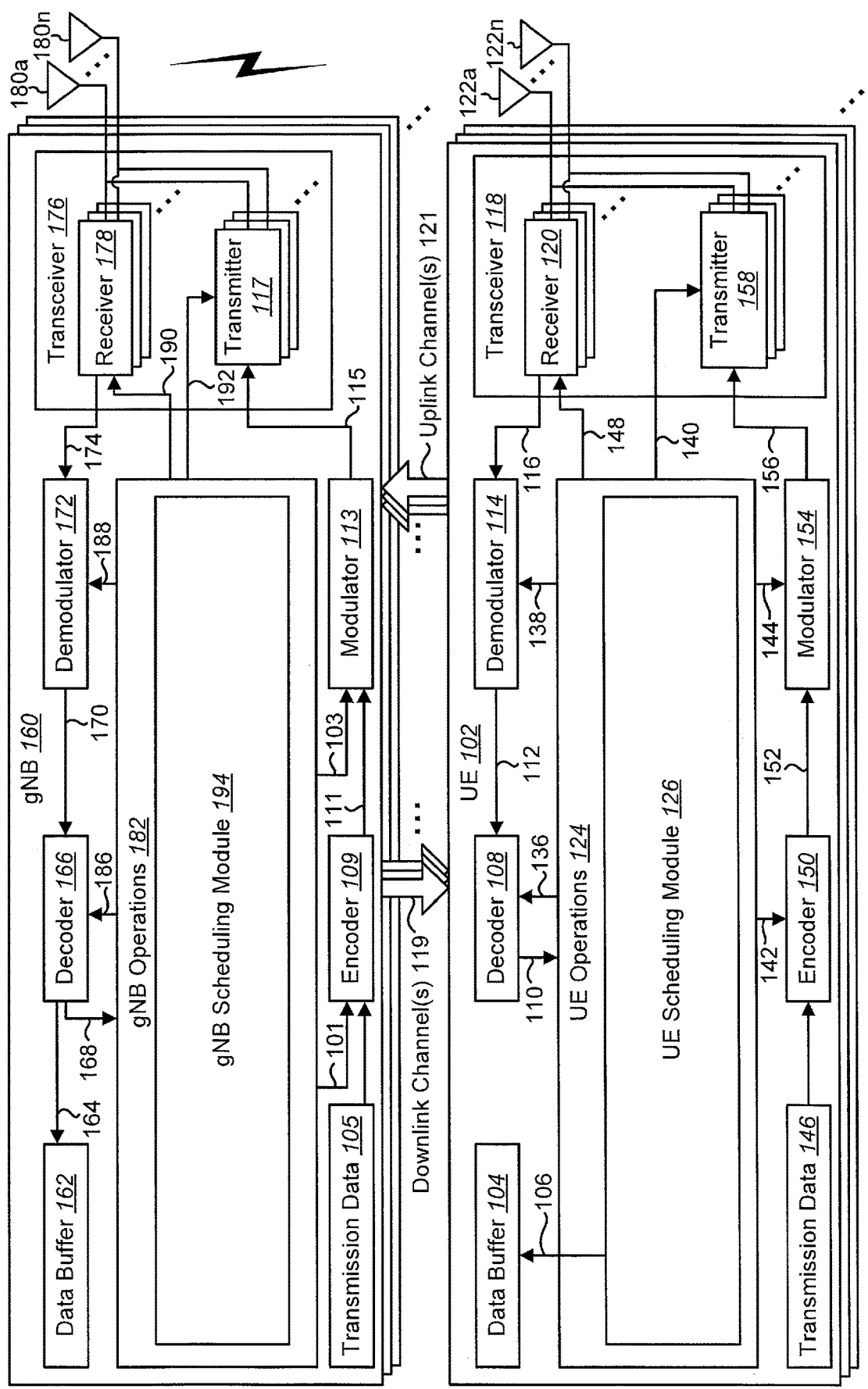
FIG. 1 is a block diagram illustrating one implementation of one or more base stations (gNBs) and one or more user equipments (UEs) for uplink support of reduced capability New Radio devices.

A user equipment (UE) is described. The UE includes receiving circuitry configured to receive downlink control information (DCI) for uplink transmission with reduced capability. The DCI includes a time domain resource assignment field. The UE also includes a processor configured to determine a resource allocation based on the DCI with the time domain resource assignment field.

A base station (gNB) is also described. The gNB includes a processor configured to determine a resource allocation for a user equipment (UE). The gNB also includes transmitting circuitry configured to transmit, to the UE, downlink control information (DCI). The DCI includes a time domain resource assignment field indicating a resource allocation for uplink transmission with reduced capability.

A method by a user equipment (UE) is also described. The method includes receiving signaling that includes downlink control information (DCI) for uplink transmission with reduced capability. The DCI includes a time domain resource assignment field. The method also includes determining a resource allocation based on the DCI with the time domain resource allocation field.

A method by a base station (gNB) is also described. The method includes determining a resource allocation for a user equipment (UE). The method also includes transmitting, to the UE, downlink control information (DCI). The DCI includes a time domain resource assignment field indicating a resource allocation for uplink transmission with reduced capability.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IOT)) but lower than URLLC and eMBB.

Similar to connected industries, 5G connectivity can serve as a catalyst for the next wave smart city innovations. As an example, the smart city vertical covers data collection and processing to more efficiently monitor and control city resources, and to provide services to city residents. For example, the deployment of surveillance cameras is part of the smart city and may also be used in factories and industries.

Moreover, a wearables use case may include smart watches, rings, eHealth related devices, and medical monitoring devices etc. One characteristic for this use case is that the device is small in size.

These cases above may have some special requirements. The main motivation for the new device type is to lower the device cost and complexity as compared to high-end eMBB and URLLC devices of Rel-15/Rel-16. This is especially the case for industrial sensors. The requirement for most use cases is that the standard enables a device design with compact form factor. Systems should support all FR1/FR2 bands for FDD and TDD.

This disclosure introduces examples of a UE feature and parameter list with lower end capabilities, relative to Release 16 eMBB and URLLC NR to serve the use cases mentioned above. The use cases, services and/or scenarios described herein may be also be named as NR-Light.

Some configurations of the systems and methods described herein teach approaches for NR-Light transmission and/or retransmission management to meet the latency and/or reliability and/or complexity requirements of reduced capability UEs.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 for uplink support of reduced capability New Radio devices. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. In some examples, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For instance, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE 102 may utilize the UE scheduling module 126 to perform one or more downlink receptions and/or one or more uplink transmissions. The downlink reception(s) may include reception of data, reception of downlink control information, and/or reception of downlink reference signals. The uplink transmissions include transmission of data, transmission of uplink control information, and/or transmission of uplink reference signals.

In a radio communication system, physical channels (e.g., uplink physical channels and/or downlink physical channels) may be defined. The physical channels (e.g., uplink physical channels and/or downlink physical channels) may be used for communicating (e.g., transmitting and/or receiving) information that is delivered from a higher layer.

For example, in uplink, a Physical Random Access Channel (PRACH) may be defined. In some approaches, the PRACH (and/or a random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., an uplink physical shared channel (PSCH) (e.g., PUCCH) resource).

In some examples, a physical uplink control channel (PUCCH) may be defined. The PUCCH may be used for transmitting uplink control information (UCI). The UCI may include hybrid automatic repeat request-acknowledgement (HARQ-ACK), channel state information (CSI) and/or a scheduling request (SR). The HARQ-ACK may be used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI may be used for indicating state of downlink channel (e.g., a downlink signal(s)). The SR may be used for requesting uplink data resources (e.g., Transport block(s), MAC PDU and/or Uplink Shared Channel (UL-SCH)).

The DL-SCH and/or the UL-SCH may be a transport channel or channels used in the MAC layer. One or more transport blocks (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In downlink, a physical downlink control channel (PDCCH) may be defined. The PDCCH may be used for transmitting downlink control information (DCI). In some examples, more than one DCI format may be defined for DCI transmission on the PDCCH. For instance, fields may be defined in the DCI format(s), and the fields may be mapped to the information bits (e.g., DCI bits).

In some examples, a DCI format 1_0 that is used for scheduling of the PDSCH in the cell may be defined as a DCI format for the downlink. As described herein one or more Radio Network Temporary Identifiers (e.g., the Cell RNTI(s) (C-RNTI(s))), Configured Scheduling RNTI(s) (CS-RNTI(s)), System Information RNTI(s) (SI-RNTI(s)), and/or Random Access RNTI(s) (RA-RNTI(s)) may be used to transmit the DCI format 1_0. In some examples, the DCI format 1_0 may be monitored (e.g., transmitted, mapped) in a Common Search Space (CSS) and/or a UE Specific Search space (USS). In some examples, the DCI format 1_0 may be monitored (e.g., transmitted, mapped) in the CSS only.

For example, a DCI included in the DCI format 1_0 may be a frequency domain resource assignment (e.g., for the PDSCH). Additionally or alternatively, the DCI included in the DCI format 1_0 may be a time domain resource assignment (for a PDSCH, for instance). Additionally or alternatively, the DCI included in the DCI format 1_0 may be a modulation and coding scheme (for the PDSCH, for instance). Additionally or alternatively, the DCI included in the DCI format 1_0 may be a new data indicator. Additionally or alternatively, the DCI included in the DCI format 1_0 may be a HARQ process number. Additionally or alternatively, the DCI included in the DCI format 1_0 may be a Transmission Power Control (TPC) command for a scheduled PUCCH. The DCI format 1_0 and/or modified/enhanced DCI format 1_0 may be used for scheduling a PDSCH and/or downlink channel for reduced capability UE(s) and its service(s).

Additionally or alternatively, a DCI format 1_1 that is used for scheduling of the PDSCH in the cell may be defined as a DCI format for the downlink. Additionally or alternatively, the C-RNTI and/or the CS-RNTI may be used to transmit the DCI format 1_1. Additionally or alternatively, the DCI format 1_1 may be monitored (e.g., transmitted and/or mapped) in the CSS and/or the USS.

For example, the DCI included in the DCI format 1_1 may be a bandwidth part (BWP) indicator (for the PDSCH, for instance). Additionally or alternatively, the DCI included in the DCI format 1_1 may be a frequency domain resource assignment (for the PDSCH, for instance). Additionally or alternatively, the DCI included in the DCI format 1_1 may be a time domain resource assignment (e.g., for the PDSCH). Additionally or alternatively, the DCI included in the DCI format 1_1 may be a modulation and coding scheme (for the PDSCH, for instance). Additionally or alternatively, the DCI included in the DCI format 1_1 may be a new data indicator. Additionally or alternatively, the DCI included in the DCI format 1_1 may be a HARQ process number. Additionally or alternatively, the DCI included in the DCI format 1_1 may be a TPC command for a scheduled PUCCH. Additionally or alternatively, the DCI included in the DCI format 1_1 may be a CSI request that is used for requesting (e.g., triggering) transmission of the CSI (e.g., CSI reporting (e.g., aperiodic CSI reporting)). Additionally or alternatively, as described below, the DCI included in the DCI format 1_1 may be information (e.g., SPS configuration index) used for indicating an index of a configuration of a DL Semi-Persistent Scheduling (SPS). The DCI format 1_1 and/or modified/enhanced DCI format 1_1 may be used for scheduling a PDSCH and/or downlink channel for reduced capability UE(s) and its service(s).

Additionally or alternatively, a new DCI format (e.g., DCI format 1_2) that is used for scheduling of the PDSCH in the cell may be defined as a DCI format for the downlink. Additionally or alternatively, the C-RNTI and/or the CS-RNTI may be used to transmit the DCI format 1_2. Additionally or alternatively, the DCI format 1_2 may be monitored (e.g., transmitted and/or mapped) in the CSS and/or the USS.

For example, the DCI included in the DCI format 1_2 may be a BWP indicator (for the PDSCH, for instance). Additionally or alternatively, the DCI included in the DCI format 1_2 may be a frequency domain resource assignment (for the PDSCH, for instance). Additionally or alternatively, the DCI included in the DCI format 1_2 may be a time domain resource assignment (for the PDSCH, for instance). Additionally or alternatively, the DCI included in the DCI format 1_2 may be a modulation and coding scheme (for the PDSCH, for instance). Additionally or alternatively, the DCI included in the DCI format 1_2 may be a new data indicator. Additionally or alternatively, the DCI included in the DCI format 1_2 may be a HARQ process number. Additionally or alternatively, the DCI included in the DCI format 1_2 may be a TPC command for a scheduled PUCCH. Additionally or alternatively, the DCI included in the DCI format 1_2 may be a CSI request that is used for requesting (e.g., triggering) transmission of the CSI (e.g., CSI reporting (e.g., aperiodic CSI reporting)). Additionally or alternatively, the as a DCI format for the uplink. Additionally or alternatively, the C-RNTI, the CS-RNTI, and/or the Temporary C-RNTI may be used to transmit the DCI format 0_0. Additionally or alternatively, the DCI format 0_0 may be monitored (e.g., transmitted, mapped) in the CSS and/or the USS. In some examples, the DCI format 0_0 may be monitored (e.g., transmitted, mapped) in the CSS only.

For example, the DCI included in the DCI format 0_0 may be a frequency domain resource assignment (for the PUSCH, for instance). Additionally or alternatively, the DCI included in the DCI format 0_0 may be a time domain resource assignment (for the PUSCH, for instance). Additionally or alternatively, the DCI included in the DCI format 0_0 may be a modulation and coding scheme (for the PUSCH, for instance). Additionally or alternatively, the DCI included in the DCI format 0_0 may be a new data indicator. Additionally or alternatively, the DCI included in the DCI format 0_0 may be a HARQ process number. Additionally or alternatively, the DCI included in the DCI format 0_0 may be a redundancy version. Additionally or alternatively, the DCI included in the DCI format 0_0 may be a TPC command for a scheduled PUSCH. The DCI format 0_0 and/or modified/enhanced DCI format 0_0 may be used for scheduling a PUSCH and/or uplink channel for reduced capability UE(s) and its service(s). Listing 1 shows an example of DCI format 0_0.

Listing 1

- Identifier for DCI formats - [1] bit
- Frequency domain resource assignment
- Time domain resource assignment- X bits as defined in Subclause 6.1.2.1 of[6, TS38.214]
- Frequency hopping flag - 1 bit
- Modulation and coding scheme - 5 bits as defined in Subclause 6.1.3 of[6, TS38.214]
- New data indicator - 1 bit
- Redundancy version - 2 bite as defined in Table 7.3.1.1.1-2
- HARQ process number - 4 bits
- TPC command for scheduled PUSCH - [2] bits as defined in Subclause x.x of[5, TS3 8.213]
- UL/SUL indicator - 1 bit for UEs configured with SUL in the cell as defined in Table 7.3.1.1.1-1 and the number of bits for DCI format 1_0 before padding is larger than the number of bits for DCI format 0_0 before padding; 0 bit otherwise.

DCI included in the DCI format 1_2 may be a configurable field(s), e.g., Antenna port(s) [0~2 bits], Transmission configuration indication [0~3 bits], Rate matching indicator [0~2 bits], sounding reference signal (SRS) request [0~3 bits], PRB bundling size indicator [0~1 bit], Carrier indicator [0~3 bits], CSI request [0~3 bits], ZP CSI-RS triggering [0~2 bits], Beta offset indicator [0~2 bits], SRS resource indicator [0~4 bits], Repetition factor [0~2 bits], and/or Priority indication [0~3 bits]. Additionally or alternatively, as described below, the DCI included in the DCI format 1_2 may be information (e.g., SPS configuration index) used for indicating an index of a configuration of a DL Semi-Persistent Scheduling (SPS). The DCI format 1_2 and/or modified/enhanced DCI format 1_2 may be used for scheduling a PDSCH and/or downlink channel for reduced capability UE(s) and its service(s).

Additionally or alternatively, a new DCI format (e.g., DCI format 1_3) that is used for scheduling of the PDSCH in the cell may be defined as a DCI format for the downlink. Additionally or alternatively, the C-RNTI and/or the CS-RNTI may be used to transmit the new DCI format (e.g., DCI format 1_3). Additionally or alternatively, the DCI format 1_3 may be monitored (e.g., transmitted and/or mapped) in the CSS and/or the USS.

Additionally or alternatively, a DCI format 0_0 that is used for scheduling of the PUSCH in the cell may be defined Additionally or alternatively, a DCI format 0_1 that is used for scheduling of the PUSCH in the cell may be defined as a DCI format for the uplink. Additionally or alternatively, the C-RNTI and/or the CS-RNTI may be used to transmit the DCI format 0_1. Additionally or alternatively, the DCI format 0_1 may be monitored (e.g., transmitted, mapped) in the CSS and/or the USS.

For example, the DCI included in the DCI format 0_1 may be a BWP indicator (for the PUSCH, for instance). Additionally or alternatively, the DCI included in the DCI format 0_1 may be a frequency domain resource assignment (for the PUSCH, for instance). Additionally or alternatively, the DCI included in the DCI format 0_1 may be a time domain resource assignment (for the PUSCH, for instance). Additionally or alternatively, the DCI included in the DCI format 0_1 may be a modulation and coding scheme (e.g., for the PUSCH). Additionally or alternatively, the DCI included in the DCI format 0_1 may be a new data indicator. Additionally or alternatively, the DCI included in the DCI format 0_1 may be a HARQ process number. Additionally or alternatively, the DCI included in the DCI format 0_1 may be a TPC command for a scheduled PUSCH. Additionally or alternatively, the DCI included in the DCI format 0_1 may be a CSI request that is used for requesting the CSI reporting. Additionally or alternatively, as described below, the DCI included in the DCI format 0_1 may be information (e.g., CG configuration index) used for indicating an index of a configuration of a configured grant. The DCI format 0_1 and/or modified/enhanced DCI format 0_1 may be used for scheduling a PUSCH and/or uplink channel for reduced capability UE(s) and its service(s). Listing 2 shows an example of DCI format 0_1.

---

Listing 2

---

- Carrier indicator - 0 or 3 bits, as defined in Subclause x.x of[5, TS38.213].
- UL/SUL indicator - 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1 [TS38.212].
- Identifier for DCI formats - [1] bit
- Bandwidth part indicator - 0, 1 or 2 bits as defined in Table 7.3.1.1.2-1 [TS38.212]. The bitwidth for this field is determined according to the higher layer parameter BandwidthPart-Config for the PUSCH.
- Frequency domain resource assignment
- Time domain resource assignment - 0, 1, 2, 3, or 4 bits as defined in Subclause 6.1.2.1 of[6, TS38.214]. The bitwidth for this field is determined as $\lceil \log_2 (I) \rceil$ bits, where I the number of rows in the higher layer parameter [pusch-symbolAllocation].
- VRB-to-PRB mapping - 0 or 1 bit
- Frequency hopping flag - 0 or 1 bit
- New data indicator - 1 bit
- Redundancy version - 2 bits as defined in Table 7.3.1.1.1-2
- HARQ process number - 4 bits
- $1^{st}$ downlink assignment index - 1 or 2 bits
- $2^{nd}$ downlink assignment index - 0 or 2 bits
- TPC command for scheduled PUSCH - 2 bits as defined in Subclause 7.1.1 of[5, TS38.213]
- SRS resource indicator
- Precoding information and number of layers - number of bits determined by the following:
- Antenna ports - number of bits determined by the following
- SRS request - 2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24.
- CSI request - 0, 1, 2, 3, 4, 5, or 6 bits determined by higher layer parameter ReportTriggerSize.
- CBG transmission information (CBGTI) - 0, 2, 4, 6, or 8 bits determined by higher layer parameter maxCodeBlockGroupsPerTransportBlock for PUSCH.
- PTRS-DMRS association - number of bits determined as follows
- beta_ofiset indicator - 0 if the higher layer parameter dynamic in uci-on-PUSCH is not configured; otherwise 2 bits as defined by Table 7.3.1.1.2-27.
- DMRS sequence initialization - 0 if the higher layer parameter PUSCH-tp=Enabled or 1 bit if the higher layer parameter PUSCH-tp=Disabled for $n_{SCID}$ selection defined in Subclause 7.4.1.1.1 of[4, TS38.211].

---

Additionally or alternatively, a DCI format 0_2 that is used for scheduling of the PUSCH in the cell may be defined as a DCI format for the uplink. Additionally or alternatively, the C-RNTI and/or the CS-RNTI may be used to transmit the DCI format 0_2. Additionally or alternatively, the DCI format 0_2 may be monitored (e.g., transmitted, mapped) in the CSS and/or the USS.

For example, the DCI included in the DCI format 0_2 may be a BWP indicator (for the PUSCH, for instance). Additionally or alternatively, the DCI included in the DCI format 0_2 may be a frequency domain resource assignment (for the PUSCH, for instance). Additionally or alternatively, the DCI included in the DCI format 0_2 may be a time domain resource assignment (for the PUSCH, for instance). Additionally or alternatively, the DCI included in the DCI format 0_2 may be a modulation and coding scheme (for the PUSCH, for instance). Additionally or alternatively, the DCI included in the DCI format 0_2 may be a new data indicator. Additionally or alternatively, the DCI included in the DCI format 0_2 may be a HARQ process number. Additionally or alternatively, the DCI included in the DCI format 0_2 may be a TPC command for a scheduled PUSCH. Additionally or alternatively, the DCI included in the DCI format 0_2 may be a CSI request that is used for requesting the CSI reporting. Additionally or alternatively, the DCI included in the DCI format 0_2 may be a configurable field(s), e.g., Antenna port(s) [0~2 bits], Transmission configuration indication [0~3 bits], Rate matching indicator [0~2 bits], SRS request [0~3 bits], PRB bundling size indicator [0~1 bit], Carrier indicator [0~3 bits], CSI request [0~3 bits], ZP CSI-RS triggering [0~2 bits], Beta offset indicator [0~2 bits], SRS resource indicator [0~4 bits], Repetition factor [0~2 bits], and/or Priority indication [0~3 bits]. Additionally or alternatively, as described below, the DCI included in the DCI format 0_2 may be information (e.g., CG configuration index) used for indicating an index of a configuration of a configured grant. The DCI format 0_2 and/or modified/enhanced DCI format 0_2 may be used for scheduling a PUSCH and/or uplink channel for reduced capability UE(s) and its service(s).

Additionally or alternatively, a new DCI format (e.g., DCI format 0_3) that is used for scheduling of the PUSCH in the cell may be defined as a DCI format for the uplink. Additionally or alternatively, the C-RNTI and/or the CS-RNTI may be used to transmit the DCI format 0_3. Additionally or alternatively, the DCI format 0_3 may be monitored (e.g., transmitted, mapped) in the CSS and/or the USS.

Additionally or alternatively, in a case that the DCI format 1_0 and/or the DCI format 1_1 and/or the DCI format 1_2 and/or the DCI format 1_3 is received (based on the detection of the DCI format 1_0 and/or the DCI format 1_1 and/or the DCI format 1_2 and/or the DCI format 1_3, for example), the UE 102 may perform the PDSCH reception. Additionally or alternatively, in a case that the DCI format 0_0 and/or the DCI format 0_1 and/or the DCI format 0_2 and/or the DCI format 0_3 is received (based on the detection of the DCI format 0_0 and/or the DCI format 0_1 and/or DCI format 0_2 and/or the DCI format 0_3, for example), the UE 102 may perform the PUSCH transmission.

In some examples, as described above, a RNTI(s) (e.g., a Radio Network Temporary Identifier(s)) assigned to the UE

102 may be used for transmission of DCI (e.g., the DCI format(s), DL control channel(s) (e.g., the PDCCH(s))). For instance, the gNB 160 may transmit (by using the RRC message, for example) information used for configuring (e.g., assigning) the RNTI(s) to the UE 102.

For example, Cyclic Redundancy Check (CRC) parity bits (which may be referred to simply as CRC), which are generated based on DCI, may be attached to DCI, and, after attachment, the CRC parity bits may be scrambled by the RNTI(s). The UE 102 may attempt to decode (e.g., blind decode, monitor, detect) DCI to which the CRC parity bits scrambled by the RNTI(s) are attached. For example, the UE 102 may detect a DL control channel (e.g., the PDCCH, the DCI, the DCI format(s)) based on the blind decoding. For instance, the UE 102 may decode the DL control channel(s) with the CRC scrambled by the RNTI(s). In other words, the UE 102 may monitor the DL control channel(s) with the RNTI(s). For example, the UE 102 may detect the DCI format(s) with the RNTI(s).

In some examples, the RNTI(s) may include the C-RNTI(s) (Cell-RNTI(s)), the CS-RNTI(s) (Configured Scheduling C-RNTI(s)), the SI-RNTI(s) (System Information RNTI(s)), the RA-RNTI(s) (Random Access-RNTI(s)), and/or the Temporary C-RNTI(s). For example, the C-RNTI(s) may be a unique identification used for identifying a RRC connection and/or scheduling. Additionally or alternatively, the CS-RNTI(s) may be a unique identification used for scheduling of transmission based on a configured grant. Additionally or alternatively, the SI-RNTI may be used for identifying system information (SI) (e.g., an SI message) mapped on the BCCH and dynamically carried on DL-SCH. Additionally or alternatively, the SI-RNTI may be used for broadcasting of SI. Additionally or alternatively, the RA-RNTI may be an identification used for the random access procedure (e.g., Msg.2 transmission). Additionally or alternatively, the Temporary C-RNTI may be used for the random access procedure (e.g., scheduling of Msg.3 (re)transmission (e.g., Msg.3 PUSCH (re)transmission)).

Additionally or alternatively, a new RNTI (e.g., L-RNTI) may be introduced for reduced capability UE(s) and its service(s). For example, in a case that the DCI format 1_0 and/or the DCI format 1_1 and/or the DCI format 1_2 and/or the DCI format 1_3 with CRC scrambled by L-RNTI is received (based on the detection of the DCI format 1_0 and/or the DCI format 1_1 and/or the DCI format 1_2 and/or the DCI format 1_3, for example), the UE 102 may perform the PDSCH reception for NR light transmission service(s). Additionally or alternatively, in a case that the DCI format 0_0 and/or the DCI format 0_1 and/or the DCI format 0_2 and/or the DCI format 0_3 with CRC scrambled by L-RNTI is received (based on the detection of the DCI format 0_0 and/or the DCI format 0_1 and/or DCI format 0_2 and/or the DCI format 0_3, for example), the UE 102 may perform the PUSCH transmission for NR light transmission service(s).

Additionally or alternatively, separate RNTIs may be introduced for UL and DL. For example, a new RNTI (e.g., L-UL-RNTI) may be introduced for reduced capability UE(s) and its UL transmission service(s) while a new RNTI (e.g., L-DL-RNTI) may be introduced for reduced capability UE(s) and its DL transmission service(s). In a case that the DCI format 1_0 and/or the DCI format 1_1 and/or the DCI format 1_2 and/or the DCI format 1_3 with CRC scrambled by L-DL-RNTI is received (based on the detection of the DCI format 1_0 and/or the DCI format 1_1 and/or the DCI format 1_2 and/or the DCI format 1_3, for example), the UE 102 may perform the PDSCH reception for NR light transmission service(s). Additionally or alternatively, in a case that the DCI format 0_0 and/or the DCI format 0_1 and/or the DCI format 0_2 and/or the DCI format 0_3 with CRC scrambled by L-UP-RNTI is received (based on the detection of the DCI format 0_0 and/or the DCI format 0_1 and/or DCI format 0_2 and/or the DCI format 0_3, for example), the UE 102 may perform the PUSCH transmission for NR light transmission service(s).

Additionally or alternatively, a physical downlink shared channel (PDSCH) and a physical uplink shared channel (PUSCH) may be defined. For example, in a case that the PDSCH (e.g., the PDSCH resource) is scheduled by using the DCI format(s), the UE 102 may receive the downlink data, on the scheduled PDSCH (e.g., the PDSCH resource). Additionally or alternatively, in a case that the PUSCH (e.g., the PUSCH resource) is scheduled by using the DCI format(s), the UE 102 transmits the uplink data on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., UL-SCH(s), an uplink transport block(s)).

In some examples, the PDSCH and/or the PUSCH may be used to transmit information of a higher layer (e.g., a radio resource control (RRC)) layer, and/or a MAC layer). For example, the PDSCH (from the gNB 160 to the UE 102, for instance) and/or the PUSCH (from the UE 102 to the gNB 160, for instance) may be used to transmit a RRC message (e.g., a RRC signal). Additionally or alternatively, the PDSCH (from the gNB 160 to the UE 102, for instance) and/or the PUSCH (from the UE 102 to the gNB 160, for instance) may be used to transmit a MAC control element (a MAC CE). In some examples, the RRC message and/or the MAC CE may be referred to as a higher layer signal.

In some approaches, a physical broadcast channel (PBCH) may be defined. For example, the PBCH may be used for broadcasting the master information block (MIB). In some examples, system information may be divided into the MIB and a number of system information block(s) (SIB(s)). For example, the MIB may be used for carrying minimum system information. Additionally or alternatively, the SIB(s) may be used for carrying system information messages.

In some approaches, in downlink, a Synchronization Signal (SS) may be defined. The SS may be used for acquiring time and/or frequency synchronization with a cell. Additionally or alternatively, the SS may be used for detecting a physical layer cell ID of the cell.

In the radio communication for uplink, UL reference signal(s) (RS(s)) may be used as uplink physical signal(s). Additionally or alternatively, in the radio communication for downlink, DL RS(s) may be used as downlink physical signal(s). In some examples, the uplink physical signal(s) and/or the downlink physical signal(s) may not be used to transmit information that is provided from the higher layer, but is used by a physical layer.

In some examples, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

The details of new DCI formats (e.g., DCI format 0_3, DCI format 1_3) are described herein.

For reduced capability UE(s) and its service(s), the current DCI format (e.g., DCI format 0_0, DCI format 0_1, DCI format 0_2) may not be supportive and/or suitable. Some information may be necessary to be updated/modified in DCI (e.g., antenna port(s), transmission configuration indication, rate matching indicator, SRS request, PRB bundling size indicator, carrier indicator, CSI request, ZP CSI-RS triggering, beta offset indicator, SRS resource indicator, repetition factor, priority indication, and so on). The potential UE complexity reduction features may include reduced number of UE RX/TX antennas, UE Bandwidth reduction (e.g., Rel-15 SSB bandwidth should be reused and L1 changes minimized), relaxed UE processing time, Half-Duplex-FDD, relaxed UE processing capability, reduced PDCCH monitoring by smaller numbers of blind decodes and CCE limits. In this case, a new DCI format and/or current DCI format with modifications and/or enhancements may be introduced.

In an implementation, a new DCI format (e.g., DCI format 0_3, specifications may use a different name) may be introduced. DCI format 0_3 may be used for the scheduling of PUSCH in one cell. The following information may be transmitted by means of the DCI format 0_3.

DCI format 0_3 may include an identifier for DCI formats. The value of this field may be set to a predefined and/or defaulted value (e.g., 0 or 1), indicating a new/different DCI format (comparing to DCI format 0_0 and/or DCI format 0_1 and/or DCI format 0_2) for reduced capability UE(s) and its service(s).

DCI format 0_3 may include an identifier for UL/DL DCI formats. The value of this field may be set to a predefined and/or defaulted value (e.g., 0 or 1), indicating an UL DCI format.

DCI format 0_3 may include modulation and coding scheme (MCS) field. The bitwidth of the MCS filed may be 5 bits or a reduced size (e.g., 1, 2, 3, 4 bits). The number of bits in this bit field may be determined by higher layer (e.g., RRC configuration, an explicit high layer parameter). The number of bits in this bit field may be determined by configured MCS table (e.g., higher layer parameter mcs-Table). Any of the high layer parameters used to determine the number of bits in this field may be commonly configured for DCI format 0_3 and other DCI formats, or separately configured for DCI format 0_3. In other words, parameter(s) configured for other DCI format(s) (e.g., DCI format 0_0 and/or DCI format 0_1 and/or DCI format 0_2) field size determination may be also used to determine the number of bits in the corresponding bit field for DCI format 0_3, or parameter(s) used to determine the number of bits in the corresponding bit field for DCI format 0_3 may be configured separately. Existing MCS tables for current DCI formats (e.g., DCI format 0_0, DCI format 0_1, DCI format 0_2) may be reused/provided for DCI format 0_3, e.g., qam256 table, qam64 table or qam64LowSE table. A new MCS table may be configured/provided for DCI format 0_3 separately, e.g., a new MCS table with 16 (or less than 16) rows. In yet another implementation, a truncated existing MCS table(s) may be used/configured/provided for DCI format 0_3. Namely, some of rows in the existing MCS table(s) for current DCI formats (e.g., DCI format 0_0, DCI format 0_1, DCI format 0_2) may be configured/provided for DCI format 0_3.

DCI format 0_3 may include antenna ports. The number of bits in this bit field may be 0-2 bits. The number of bits in this bit field may be determined by higher layer (e.g., RRC configuration, an explicit high layer parameter). The number of bits in this bit field may be determined by configured waveform (e.g., whether transform precoder is enabled or not). The number of bits in this bit field may be determined by DMRS type, rank, codebook and/or any other related high layer parameters. Any of the high layer parameters used to determine the number of bits in this field may be commonly configured for DCI format 0_3 and other DCI formats, or separately configured for DCI format 0_3. In other words, parameter(s) configured for other DCI format(s) (e.g., DCI format 0_0 and/or DCI format 0_1 and/or DCI format 0_2) field size determination may be also used to determine the number of bits in the corresponding bit field for DCI format 0_3, or parameter(s) used to determine the number of bits in the corresponding bit field for DCI format 0_3 may be configured separately. For example, the field may be 0 bit if a higher layer parameter (e.g., AntennaPorts-Field-Presence-ForDCIFormat0_3) is not configured. If the higher layer parameter (e.g., AntennaPorts-FieldPresence-ForDCIFormat0_3) is configured, the field size may be a fixed value (e.g., 1, 2) defined in the spec, or determined by other higher layer parameters, e.g., transform precoder enabler, DMRS type, max length, codebook, mapping type (e.g., dmrs-UplinkForPUSCH-MappingTypeA-ForDCIFormat0_3 and/or dmrs-UplinkForPUSCH-MappingTypeB-ForDCIFormat0_3).

DCI format 0_3 may include a transmission configuration indication. The number of bits in this bit field may be 0-3 bits. The number of bits in this bit field may be determined by higher layer (e.g., RRC configuration, an explicit high layer parameter). The number of bits in this bit field may be determined by a configured number of multiple transmission configurations. For example, if multiple configurations are not enabled, the number of bits in this field is 0 or this bit field is absent in DCI. If the number of transmission configuration is 8, the number of bits in this field may be 3. If multiple transmission configurations are enabled and/or configured, only DCI format 0_3 may be used to activate and/or deactivate corresponding configured grant(s).

DCI format 0_3 may include an SRS request. The number of bits in this bit field may be 0-2 bits. The number of bits in this bit field may be determined by higher layer (e.g., RRC configuration, an explicit high layer parameter). The number of bits in this bit field may be determined by configured carrier (e.g., whether SUL is configured or not). The number of bits in this bit field may be determined by a configured and/or predefined table and/or any other related high layer parameters. Any of the high layer parameters used to determine the number of bits in this field may be commonly configured for DCI format 0_3 and other DCI formats, or separately configured for DCI format 0_3. In other words, parameter(s) and/or table(s) configured for other DCI format(s) (e.g., DCI format 0_0 and/or DCI format 0_1 and/or DCI format 0_2) field size determination may be also used to determine the number of bits in the corresponding bit field for DCI format 0_3, or parameter(s) used to determine the number of bits in the corresponding bit field for DCI format 0_3 may be configured separately. For example, For example, the field may be 0 bit if a higher layer parameter (e.g., SRSRequest-ForDCIFormat0_3) is not configured. If the higher layer parameter (e.g., SRSRequest-ForDCIFormat0_3) is configured, the field size may be provided/determined by the higher layer parameter (e.g., SRSRequest-ForDCIFormat0_3). The field size may be a fixed value (e.g., 1, 2) defined in the spec. The field size may also be determined by other higher layer parameters, e.g., supplement uplink (e.g., supplementaryUplink in ServingCellConfig).

DCI format 0_3 may include a carrier indication. The number of bits in this bit field may be 0-3 bits. The number of bits in this bit field may be determined by higher layer (e.g., RRC configuration, an explicit high layer parameter). The number of bits in this bit field may be determined by a configured number of carriers. For example, if multiple carriers are not enabled and/or configured, the number of bits in this field is 0 or this bit field is absent in DCI. If the number of carriers is larger than 4, the number of bits in this field may be 3. Any of the high layer parameters used to determine the number of bits in this field may be commonly configured for DCI format 0_3 and other DCI formats, or separately configured for DCI format 0_3. In other words, parameter(s) and/or table(s) configured for other DCI format(s) (e.g., DCI format 0_0 and/or DCI format 0_1 and/or DCI format 0_2) field size determination may be also used to determine the number of bits in the corresponding bit field for DCI format 0_3, or parameter(s) used to determine the number of bits in the corresponding bit field for DCI format 0_3 may be configured separately. For example, the field size may be a value (e.g., 0, 1, 2 or 3 bits) determined by higher layer parameter (e.g., CarrierIndicatorSize-ForDCIFormat0_3).

DCI format 0_3 may include a CSI request. The number of bits in this bit field may be 0-3 bits. The number of bits in this bit field may be determined by higher layer (e.g., RRC configuration, an explicit high layer parameter). The number of bits in this bit field may be determined by CSI configuration. The number of bits in this bit field may be determined by a configured and/or predefined table, and/or any other related high layer parameters. Any of the high layer parameters used to determine the number of bits in this field may be commonly configured for DCI format 0_3 and other DCI formats, or separately configured for DCI format 0_3. In other words, parameter(s) and/or table(s) configured for other DCI format(s) (e.g., DCI format 0_0 and/or DCI format 0_1 and/or DCI format 0_2) field size determination may be also used to determine the number of bits in the corresponding bit field for DCI format 0_3, or parameter(s) used to determine the number of bits in the corresponding bit field for DCI format 0_3 may be configured separately. For example, the field size may be value (e.g., 0, 1, 2, 3, 4, 5, or 6 bits) determined by higher layer parameter (reportTriggerSize-ForDCIFormat0_3).

DCI format 0_3 may include a beta_offset indicator. The number of bits in this bit field may be 0-2 bits. The number of bits in this bit field may be determined by higher layer (e.g., RRC configuration, an explicit high layer parameter). The number of bits in this bit field may be determined by beta_offset configuration type (e.g., whether beta_offset is semi-static or dynamic). The number of bits in this bit field may be determined by the configured set of beta offsets. The number of bits in this bit field may be determined by a configured and/or predefined table, and/or any other related high layer parameters. Any of the high layer parameters used to determine the number of bits in this field may be commonly configured for DCI format 0_3 and other DCI formats, or separately configured for DCI format 0_3. In other words, parameter(s) and/or table(s) configured for other DCI format(s) field size determination may be also used to determine the number of bits in the corresponding bit field for DCI format 0_3, or parameter(s) used to determine the number of bits in the corresponding bit field for DCI format 0_3 may be configured separately. For example, the field size may be determined by configured beta offset (e.g., semi-static or dynamic) and or configured number of offset indexes. The field size may be 0 bit if the higher layer parameter betaOffsets=semiStatic; otherwise 1 bit if 2 offset indexes are configured by higher layer parameter (e.g., dynamic-ForDCIFormat0_3) and 2 bits if 4 offset indexes are configured by higher layer parameter (e.g., dynamic-ForDCIFormat0_3).

DCI format 0_3 may include an SRS resource indicator. The number of bits in this bit field may be 0-4 bits. The number of bits in this bit field may be determined by higher layer (e.g., RRC configuration, an explicit high layer parameter). The number of bits in this bit field may be determined by the number of configured SRS resources in the SRS resource set. The number of bits in this bit field may be determined by the maximum number of supported layers for the PUSCH, codebook and/or any other related high layer parameters. Any of the high layer parameters used to determine the number of bits in this field may be commonly configured for DCI format 0_3 and other DCI formats, or separately configured for DCI format 0_3. In other words, parameter(s) configured for other DCI format(s) field size determination may be also used to determine the number of bits in the corresponding bit field for DCI format 0_3, or parameter(s) used to determine the number of bits in the corresponding bit field for DCI format 0_3 may be configured separately. For example, the field size may be determined by the number of configured SRS resources in the SRS resource set configured by higher layer parameter (e.g., srs-ResourceSet-ToAddModList-ForDCIFormat0_3), codebook (e.g., higher layer parameter usage of value 'codeBook' or 'nonCodeBook'), number of layers (e.g., maxMIMO-Layers-ForDCIFormat0_3), SRS resource set (e.g., srs-ResourceSetToAddModList-ForDCIFormat0_3).

DCI format 0_3 may include a repetition factor. The number of bits in this bit field may be 0-2 bits. The number of bits in this bit field may be determined by higher layer (e.g., RRC configuration, an explicit high layer parameter). The number of bits in this bit field may be determined by a configured and/or predefined set of repetition factors. For example, if dynamic indication of repetition factor is not enabled, configured and/or supported, the number of bits in this field is 0 or this bit field is absent in DCI. If dynamic indication of repetition factor is enabled, configured and/or supported, and/or the number of repetition factors in the configured and/or predefined set is 4 (e.g., {1, 2, 4, 8}), the number of bits in this field may be 2. Any of the high layer parameters, sets and/or tables used to determine the number of bits in this field may be commonly configured for DCI format 0_3 and other DCI formats, or separately configured for DCI format 0_3. In other words, parameter(s), table(s) and/or set(s) configured for other DCI format(s) field size determination may be also used to determine the number of bits in the corresponding bit field for DCI format 0_3, or parameter(s), table(s) and/or set(s) used to determine the number of bits in the corresponding bit field for DCI format 0_3 may be configured separately.

DCI format 0_3 may include a priority indication. The number of bits in this bit field may be 0-3 bits. The number of bits in this bit field may be determined by higher layer (e.g., RRC configuration, an explicit high layer parameter). The number of bits in this bit field may be determined by a configured and/or predefined set of priority levels and or the number of configured and/or predefined priority levels. For example, if PUSCH prioritization is not enabled, configured and/or supported, the number of bits in this field is 0 or this bit field is absent in DCI. If the number of configured and/or predefined PUSCH priority levels is 4 (e.g., {0, 1, 2, 3}), the number of bits in this field may be 2. Any of the high layer parameters, sets and/or tables used to determine the number of bits in this field may be commonly configured for DCI format 0_3 and other DCI formats, or separately configured for DCI format 0_3. In other words, parameter(s), table(s) and/or set(s) configured for other DCI format(s) field size determination may be also used to determine the number of bits in the corresponding bit field for DCI format 0_3, or parameter(s), table(s) and/or set(s) used to determine the number of bits in the corresponding bit field for DCI format 0_3 may be configured separately. For example, the field size may be 0 bit if higher layer parameter (e.g., PriorityIndicator-ForDCIFormat0_3) is not configured; otherwise the field size may be a value (e.g., 1 bit) provided by the higher layer parameter (e.g., PriorityIndicator-ForDCIFormat0_3).

DCI format 0_3 may include a frequency domain resource assignment. The number of bits in this bit field may be 0-6 bits. The number of bits in this bit field may be determined by higher layer (e.g., RRC configuration, an explicit high layer parameter). The number of bits in this bit field may be determined by the number of RBGs, resource allocation type, granularity by high layer (e.g., RRC configuration). Any of the high layer parameters (e.g., configured number of RBGs, resource allocation type, granularity) used to determine the number of bits in this field may be commonly configured for DCI format 0_3 and other DCI formats, or separately configured for DCI format 0_3. In other words, parameter(s) (e.g., number of RBGs, resource allocation type, granularity) configured for other DCI format(s) field size determination may be also applied to the corresponding bit field for DCI format 0_3, or parameter(s) and/or table(s) used to determine the number of bits in the corresponding bit field for DCI format 0_3 may be configured separately. For example, The bitwidth for this field is determined by higher layer parameters number of RBGs, resource allocation type, granularity (e.g., ResourceAllocationType1-granularity-ForDCIFormat0_3).

DCI format 0_3 may include a time domain resource assignment. The number of bits in this bit field may be 0-6 bits. The number of bits in this bit field may be determined by higher layer (e.g., RRC configuration, an explicit high layer parameter). The number of bits in this bit field may be determined by the number of entries in the time domain resource assignment table configured by high layer (e.g., RRC configuration) or a defaulted time domain resource assignment table. Any of the high layer parameters (e.g., configured time domain resource assignment table, defaulted and/or predefined time domain resource assignment table) used to determine the number of bits in this field may be commonly configured for DCI format 0_3 and other DCI formats, or separately configured for DCI format 0_3. In other words, parameter(s) (e.g., time domain resource assignment table configured by high layer) configured for other DCI format(s) field size determination may be also applied to the corresponding bit field for DCI format 0_3, or parameter(s) and/or table(s) used to determine the number of bits in the corresponding bit field for DCI format 0_3 may be configured separately. For example, The bitwidth for this field is determined as $\lceil \log_2(I) \rceil$ bits, where I is the number of entries in the dedicated higher layer parameter (e.g., PUSCH-TimeDomainResourceAllocation-List-ForDCIformat0_3) if the dedicated higher layer parameter is configured, or I is the number of entries in the common higher layer parameter (e.g., PUSCH-TimeDomainResourceAllocationList) if the common higher layer parameter (e.g., PUSCH-TimeDomainResourceAllocationList) is configured and the dedicated higher layer parameter (e.g., PUSCH-TimeDomainResourceAllocationList-ForDCIformat0_3) is not configured; otherwise I is the number of entries in the default table.

In yet another implementation, a new DCI format may not be introduced, but modifications and/or enhancements of current DCI format(s) may be used to schedule PUSCH for reduced capability UE(s) and its service(s). Reinterpretation of field(s) in current DCI format (e.g., DCI format 0_0 or DCI format 0_1, or DCI format 0_2) may be applied to provide necessary information to schedule PUSCH for reduced capability UE(s) and its service(s).

Bit(s) or part of bits of some bit fields (e.g., frequency domain resource assignment, time domain resource assignment, frequency hopping flag, modulation and coding scheme, new data indicator, redundancy version, HARQ process number, TPC command for scheduled PUSCH, UL/SUL indicator, etc.) in DCI format 0_0 (or DCI format 0_1 or DCI format 0_2) may be reinterpreted as a different bit field(s) (e.g., antenna port(s), transmission configuration indication, SRS request, carrier indicator, CSI request, beta offset indicator, SRS resource indicator, repetition factor, priority indication, etc.) if the reinterpretation is RRC configured, indicated explicitly or implicitly.

Existing DCI formats (e.g., DCI format 0_0, DCI format 0_1, DCI format 0_2) may be used to schedule PUSCH for reduced capability UE(s) and its service(s). The field size of each field in the existing DCI format(s) may be determined by separate RRC parameter dedicated for NR light as mentioned above (DCI field determination for DCI format 0_3). The DCI format 0_3 described above may be renamed from the existing DCI format (e.g., DCI format 0_0, DCI format 0_1, DCI format 0_2) or alias of the existing DCI format (e.g., DCI format 0_0, DCI format 0_1, DCI format 0_2).

For reduced capability UE(s) and its service(s), the current DCI format (e.g., DCI format 1_0, DCI format 1_1, DCI format 1_2) may not be supportive/suitable. Some information may be necessary to be updated/modified in DCI (e.g., antenna port(s), transmission configuration indication, rate matching indicator, SRS request, PRB bundling size indicator, carrier indicator, CSI request, ZP CSI-RS triggering, beta offset indicator, SRS resource indicator, repetition factor, priority indication, and so on). The potential UE complexity reduction features may include reduced number of UE RX/TX antennas, UE Bandwidth reduction (e.g., Rel-15 SSB bandwidth should be reused and L1 changes minimized), relaxed UE processing time, Half-Duplex-FDD, relaxed UE processing capability, reduced PDCCH monitoring by smaller numbers of blind decodes and CCE limits. In this case, a new DCI format and/or current DCI format with modifications and/or enhancements may be introduced for downlink.

For downlink, to support reduced capability UE(s) and its service(s), similarly, a new DCI format and/or current DCI format with modifications and/or enhancements may be also introduced. The DL DCI may use the same and/or a common structure and/or implementation as the UL DCI mentioned above, or the DL DCI may be implemented separately.

In an implementation, a new DCI format (e.g., DCI format 1_3, specifications may use a different name) may be introduced. DCI format 1_3 may be used for the scheduling of PDSCH in one cell. The following information may be transmitted by means of the DCI format 1_3.

DCI format 1_3 may include an identifier for DCI formats. The value of this field may be set to a predefined and/or defaulted value (e.g., 0 or 1), indicating a new/different DCI format (comparing to DCI format 1_0 and/or DCI format 1_1 and/or DCI format 1_2) for reduced capability UE(s) and its service(s).

DCI format 1_3 may include an identifier for UL/DL DCI formats. The value of this field may be set to a predefined and/or defaulted value (e.g., 0 or 1), indicating an DL DCI format.

DCI format 1_3 may include modulation and coding scheme (MCS) field. The bitwidth of the MCS filed may be 5 bits or a reduced size (e.g., 1, 2, 3, 4 bits). The number of bits in this bit field may be determined by higher layer (e.g., RRC configuration, an explicit high layer parameter). The number of bits in this bit field may be determined by configured MCS table (e.g., higher layer parameter mcs-Table). Any of the high layer parameters used to determine the number of bits in this field may be commonly configured for DCI format 1_3 and other DCI formats, or separately configured for DCI format 1_3. In other words, parameter(s) configured for other DCI format(s) (e.g., DCI format 1_0 and/or DCI format 1_1 and/or DCI format 1_2) field size determination may be also used to determine the number of bits in the corresponding bit field for DCI format 1_3, or parameter(s) used to determine the number of bits in the corresponding bit field for DCI format 1_3 may be configured separately. Existing MCS tables for current DCI formats (e.g., DCI format 1_0, DCI format 1_1, DCI format 1_2) may be reused/provided for DCI format 1_3, e.g., qam256 table, qam64 table or qam64LowSE table. A new MCS table may be configured/provided for DCI format 1_3 separately, e.g., a new MCS table with 16 (or less than 16) rows. In yet another implementation, a truncated existing MCS table(s) may be used/configured/provided for DCI format 1_3. Namely, some of rows in the existing MCS table(s) for current DCI formats (e.g., DCI format 1_0, DCI format 1_1, DCI format 1_2) may be configured/provided for DCI format 1_3.

DCI format 1_3 may include antenna ports. The number of bits in this bit field may be 0-2 bits. The number of bits in this bit field may be determined by higher layer (e.g., RRC configuration, an explicit high layer parameter). The number of bits in this bit field may be determined by configured waveform (e.g., whether transform precoder is enabled or not). The number of bits in this bit field may be determined by DMRS type, rank, codebook and/or any other related high layer parameters. Any of the high layer parameters used to determine the number of bits in this field may be commonly configured for DCI format 1_3 and other DCI formats, or separately configured for DCI format 1_3. In other words, parameter(s) configured for other DCI format(s) (e.g., DCI format 1_0 and/or DCI format 1_1 and/or DCI format 1_2) field size determination may be also used to determine the number of bits in the corresponding bit field for DCI format 1_3, or parameter(s) used to determine the number of bits in the corresponding bit field for DCI format 1_3 may be configured separately. For example, the field may be 0 bit if a higher layer parameter (e.g., AntennaPorts-Field-Presence-ForDCIFormat1_3) is not configured. If the higher layer parameter (e.g., AntennaPorts-FieldPresence-ForDCIFormat1_3) is configured, the field size may be a fixed value (e.g., 1, 2) defined in the spec, or determined by other higher layer parameters, e.g., transform precoder enabler, DMRS type, max length, codebook, mapping type (e.g., dmrs-DownlinkForPDSCH-MappingTypeA-ForDCIFormat1_3 and/or dmrs-DownlinkForPDSCH-MappingTypeB-ForDCIFormat1_3).

DCI format 1_3 may include a transmission configuration indication. The number of bits in this bit field may be 0-3 bits. The number of bits in this bit field may be determined by higher layer (e.g., RRC configuration, an explicit high layer parameter). The number of bits in this bit field may be determined by a configured number of multiple transmission configurations. For example, if multiple configurations of DL semi-persistent scheduling (SPS) are not enabled, the number of bits in this field is 0 or this bit field is absent in DCI. If the number of transmission configuration is 8, the number of bits in this field may be 3. If multiple transmission configurations are enabled and/or configured, only DCI format 1_3 may be used to activate and/or deactivate corresponding SPS.

DCI format 1_3 may include an SRS request. The number of bits in this bit field may be 0-2 bits. The number of bits in this bit field may be determined by higher layer (e.g., RRC configuration, an explicit high layer parameter). The number of bits in this bit field may be determined by configured carrier (e.g., whether SUL is configured or not). The number of bits in this bit field may be determined by a configured and/or predefined table and/or any other related high layer parameters. Any of the high layer parameters used to determine the number of bits in this field may be commonly configured for DCI format 1_3 and other DCI formats, or separately configured for DCI format 1_3. In other words, parameter(s) and/or table(s) configured for other DCI format(s) (e.g., DCI format 1_0 and/or DCI format 1_1 and/or DCI format 1_2) field size determination may be also used to determine the number of bits in the corresponding bit field for DCI format 1_3, or parameter(s) used to determine the number of bits in the corresponding bit field for DCI format 1_3 may be configured separately. For example, For example, the field may be 0 bit if a higher layer parameter (e.g., SRSRequest-ForDCIFormat1_3) is not configured. If the higher layer parameter (e.g., SRSRequest-ForDCIFormat1_3) is configured, the field size may be provided/determined by the higher layer parameter (e.g., SRSRequest-ForDCIFormat1_3). The field size may be a fixed value (e.g., 1, 2) defined in the spec. The field size may also be determined by other higher layer parameters, e.g., supplement uplink (e.g., supplementaryUplink in ServingCellConfig).

DCI format 1_3 may include a carrier indication. The number of bits in this bit field may be 0-3 bits. The number of bits in this bit field may be determined by higher layer (e.g., RRC configuration, an explicit high layer parameter). The number of bits in this bit field may be determined by a configured number of carriers. For example, if multiple carriers are not enabled and/or configured, the number of bits in this field is 0 or this bit field is absent in DCI. If the number of carriers is larger than 4, the number of bits in this field may be 3. Any of the high layer parameters used to determine the number of bits in this field may be commonly configured for DCI format 1_3 and other DCI formats, or separately configured for DCI format 1_3. In other words, parameter(s) and/or table(s) configured for other DCI format(s) (e.g., DCI format 1_0 and/or DCI format 1_1 and/or DCI format 1_2) field size determination may be also used to determine the number of bits in the corresponding bit field for DCI format 1_3, or parameter(s) used to determine the number of bits in the corresponding bit field for DCI format 1_3 may be configured separately. For example, the field size may be a value (e.g., 0, 1, 2 or 3 bits) determined by higher layer parameter (e.g., CarrierIndicatorSize-ForDCIFormat1_3).

DCI format 1_3 may include a rate matching indicator. The number of bits in this bit field may be 0-2 bits. The number of bits in this bit field may be determined by higher layer (e.g., RRC configuration, an explicit high layer parameter). The number of bits in this bit field may be determined by configured rate matching pattern group(s) and/or any related high layer parameters. Any of the high layer parameters, sets and/or tables used to determine the number of bits in this field may be commonly configured for DCI format 1_3 and other DCI formats, or separately configured for DCI format 1_3. In other words, parameter(s), table(s) and/or set(s) configured for other DCI format(s) field size determination may be also used to determine the number of bits in the corresponding bit field for DCI format 1_3, or parameter(s), table(s) and/or set(s) used to determine the number of bits in the corresponding bit field for DCI format 1_3 may be configured separately. For example, the field size may be 0, 1, or 2 bits according to higher layer parameters rateMatchPatternGroup1-ForDCIFormat1_3 and rateMatchPatternGroup2-ForDCIFormat1_3, where the MSB is used to indicate rateMatchPatternGroup1-ForDCI-Format1_3 and the LSB is used to indicate rateMatchPatternGroup2-ForDCIFormat1_3 when there are two groups.

DCI format 1_3 may include a PRB bundling size indicator. The number of bits in this bit field may be 0-1 bits. The number of bits in this bit field may be determined by higher layer (e.g., RRC configuration, an explicit high layer parameter). The number of bits in this bit field may be determined by configured PRB bundling type (e.g., whether PRB bundling is configured or not, whether PRB bundling type is configured as static or dynamic). If PRB bundling is not configured or is set as static, the number of bits in this field is 0 or this bit field is absent in DCI. Any of the high layer parameters, sets and/or tables used to determine the number of bits in this field may be commonly configured for DCI format 1_3 and other DCI formats, or separately configured for DCI format 1_3. In other words, parameter(s), table(s) and/or set(s) configured for other DCI format(s) field size determination may be also used to determine the number of bits in the corresponding bit field for DCI format 1_3, or parameter(s), table(s) and/or set(s) used to determine the number of bits in the corresponding bit field for DCI format 1_3 may be configured separately. For example, the field size may be 0 bit if the higher layer parameter PRB bundling type (e.g., prb-BundlingType-ForDCIFormat1_3) is not configured or is set to 'static', or 1 bit if the higher layer parameter PRB bundling type (e.g., prb-BundlingType-ForDCIFormat1_3) is set to 'dynamic'.

DCI format 1_3 may include ZP CSI-RS triggering. The number of bits in this bit field may be 0-2 bits. The number of bits in this bit field may be determined by higher layer (e.g., RRC configuration, an explicit high layer parameter). The number of bits in this bit field may be determined by the number of ZP CSI-RS resource sets configured in the higher layer parameter and/or any other related high layer parameters. Any of the high layer parameters used to determine the number of bits in this field may be commonly configured for DCI format 1_3 and other DCI formats, or separately configured for DCI format 1_3. In other words, parameter(s) configured for other DCI format(s) field size determination may be also used to determine the number of bits in the corresponding bit field for DCI format 1_3, or parameter(s) used to determine the number of bits in the corresponding bit field for DCI format 1_3 may be configured separately. For example, the bit-width for this field is determined as $\lceil \log_2(n_{ZP}+1) \rceil$ bits, where $n_{ZP}$ is the number of aperiodic ZP CSI-RS resource sets configured by higher layer parameter aperiodic-ZP-CSI-RS-ResourceSetsToAddModList-ForDCIFormat1_3.

DCI format 1_3 may include a repetition factor. The number of bits in this bit field may be 0-2 bits. The number of bits in this bit field may be determined by higher layer (e.g., RRC configuration, an explicit high layer parameter). The number of bits in this bit field may be determined by a configured and/or predefined set of repetition factors. For example, if dynamic indication of repetition factor is not enabled, configured and/or supported, the number of bits in this field is 0 or this bit field is absent in DCI. If dynamic indication of repetition factor is enabled, configured and/or supported, and/or the number of repetition factors in the configured and/or predefined set is 4 (e.g., $\{1, 2, 4, 8\}$), the number of bits in this field may be 2. Any of the high layer parameters, sets and/or tables used to determine the number of bits in this field may be commonly configured for DCI format 1_3 and other DCI formats, or separately configured for DCI format 1_3. In other words, parameter(s), table(s) and/or set(s) configured for other DCI format(s) field size determination may be also used to determine the number of bits in the corresponding bit field for DCI format 1_3, or parameter(s), table(s) and/or set(s) used to determine the number of bits in the corresponding bit field for DCI format 1_3 may be configured separately.

DCI format 1_3 may include a priority indication. The number of bits in this bit field may be 0-3 bits. The number of bits in this bit field may be determined by higher layer (e.g., RRC configuration, an explicit high layer parameter). The number of bits in this bit field may be determined by a configured and/or predefined set of priority levels and or the number of configured and/or predefined priority levels. For example, if PDSCH prioritization is not enabled, configured and/or supported, the number of bits in this field is 0 or this bit field is absent in DCI. If the number of configured and/or predefined PDSCH priority levels is 4 (e.g., $\{0, 1, 2, 3\}$), the number of bits in this field may be 2. Any of the high layer parameters, sets and/or tables used to determine the number of bits in this field may be commonly configured for DCI format 1_3 and other DCI formats, or separately configured for DCI format 1_3. In other words, parameter(s), table(s) and/or set(s) configured for other DCI format(s) field size determination may be also used to determine the number of bits in the corresponding bit field for DCI format 1_3, or parameter(s), table(s) and/or set(s) used to determine the number of bits in the corresponding bit field for DCI format 1_3 may be configured separately. For example, the field size may be 0 bit if higher layer parameter (e.g., Priority-Indicator-ForDCIFormat1_3) is not configured; otherwise the field size may be a value (e.g., 1 bit) provided by the higher layer parameter (e.g., PriorityIndicator-ForDCIFormat1_3).

DCI format 1_3 may include a frequency domain resource assignment. The number of bits in this bit field may be 0-6 bits. The number of bits in this bit field may be determined by higher layer (e.g., RRC configuration, an explicit high layer parameter). The number of bits in this bit field may be determined by the number of RBGs, resource allocation type, granularity by high layer (e.g., RRC configuration). Any of the high layer parameters (e.g., configured number of RBGs, resource allocation type, granularity) used to determine the number of bits in this field may be commonly configured for DCI format 1_3 and other DCI formats, or separately configured for DCI format 1_3. In other words, parameter(s) (e.g., number of RBGs, resource allocation type, granularity) configured for other DCI format(s) field size determination may be also applied to the corresponding bit field for DCI format 1_3, or parameter(s) and/or table(s) used to determine the number of bits in the corresponding bit field for DCI format 1_3 may be configured separately. For example, The bitwidth for this field is determined by higher layer parameters number of RBGs, resource allocation type, granularity (e.g., ResourceAllocationType1-granularity-ForDCIFormat1_3).

DCI format 1_3 may include a time domain resource assignment. The number of bits in this bit field may be 0-6 bits. The number of bits in this bit field may be determined by higher layer (e.g., RRC configuration, an explicit high layer parameter). The number of bits in this bit field may be determined by the number of entries in the time domain resource assignment table configured by high layer (e.g., RRC configuration) or a defaulted time domain resource assignment table. Any of the high layer parameters (e.g., configured time domain resource assignment table, defaulted and/or predefined time domain resource assignment table) used to determine the number of bits in this field may be commonly configured for DCI format 1_3 and other DCI formats, or separately configured for DCI format 1_3. In other words, parameter(s) (e.g., time domain resource assignment table configured by high layer) configured for other DCI format(s) field size determination may be also applied to the corresponding bit field for DCI format 1_3, or parameter(s) and/or table(s) used to determine the number of bits in the corresponding bit field for DCI format 1_3 may be configured separately. For example, The bitwidth for this field is determined as $\lceil \log_2(I) \rceil$ bits, where I is the number of entries in the dedicated higher layer parameter (e.g., PDSCH-TimeDomainResourceAllocation-List-ForDCIformat1_3) if the dedicated higher layer parameter is configured, or I is the number of entries in the common higher layer parameter (e.g., PDSCH-TimeDomainResourceAllocationList) if the common higher layer parameter (e.g., PDSCH-TimeDomainResourceAllocationList) is configured and the dedicated higher layer parameter (e.g., PDSCH-TimeDomainResourceAllocationList-ForDCIformat1_3) is not configured; otherwise I is the number of entries in the default table.

DCI format 1_3 may include PDSCH-to-HARQ_feedback timing indicator. The number of bits in this bit field may be 0-3 bits. The number of bits in this bit field may be determined by higher layer (e.g., RRC configuration, an explicit high layer parameter). The number of bits in this bit field may be determined by the number of K1 (i.e., delay between PDSCH reception and HARQ-ACK feedback) values configured in the higher layer parameter and/or any other related high layer parameters. Any of the high layer parameters used to determine the number of bits in this field may be commonly configured for DCI format 1_3 and other DCI formats, or separately configured for DCI format 1_3. In other words, parameter(s) configured for other DCI format(s) field size determination may be also used to determine the number of bits in the corresponding bit field for DCI format 1_3, or parameter(s) used to determine the number of bits in the corresponding bit field for DCI format 1_3 may be configured separately. For example, the bitwidth for this field is determined as $\lceil \log_2(I) \rceil$ bits, where I is the number of entries in the higher layer parameter dl-DataToUL-ACK-ForDCI-Format1_3.

DCI format 1_3 may include PUCCH resource indicator. The number of bits in this bit field may be 0-3 bits. The number of bits in this bit field may be determined by higher layer (e.g., RRC configuration, an explicit high layer parameter). Any of the high layer parameters used to determine the number of bits in this field may be commonly configured for DCI format 1_3 and other DCI formats, or separately configured for DCI format 1_3. In other words, parameter(s) configured for other DCI format(s) field size determination may be also used to determine the number of bits in the corresponding bit field for DCI format 1_3, or parameter(s) used to determine the number of bits in the corresponding bit field for DCI format 1_3 may be configured separately. For example, the bitwidth for this field may be 0 or 1 or 2 or 3 bits determined by higher layer parameter NumberofbitsforPUCCHresourceindicator-ForDCIFormat1_3.

In yet another implementation, a new DL DCI format may not be introduced, but modifications and/or enhancements of current DCI format(s) may be needed to schedule PDSCH for reduced capability UE(s) and its service(s). Reinterpretation of field(s) in current DCI format (e.g., DCI format 1_0 or DCI format 1_1 or DCI format 1_2) may be applied to provide necessary information to schedule PDSCH for reduced capability UE(s) and its service(s).

Bit(s) or part of bits of some bit fields (e.g., frequency domain resource assignment, time domain resource assignment, VRB-to-PRB mapping, modulation and coding scheme, new data indicator, redundancy version, HARQ process number, downlink assignment index, TPC command for scheduled PUCCH, PUCCH resource indicator, PDSCH-to-HARQ_feedback timing indicator, etc.) in DCI format 1_0 (or DCI format 1_1 or DCI format 1_2) may be reinterpreted as a different bit field(s) (e.g., antenna port(s), transmission configuration indication, PRB bundling size indicator, carrier indicator, rate matching indicator, ZP CSI-RS trigger, SRS request, repetition factor, priority indication, etc.) if the reinterpretation is RRC configured, indicated explicitly or implicitly.

Existing DCI formats (e.g., DCI format 1_0, DCI format 1_1, DCI format 1_2) may be used to schedule PUSCH for reduced capability UE(s) and its service(s). The field size of each field in the existing DCI format(s) may be determined by separate RRC parameter dedicated for NR light as mentioned above (DCI field determination for DCI format 1_3). The DCI format 1_3 described above may be renamed from the existing DCI format (e.g., DCI format 1_0, DCI format 1_1, DCI format 1_2) or alias of the existing DCI format (e.g., DCI format 1_0, DCI format 1_1, DCI format 1_2).

The UE scheduling module 126 may perform operations for mini-slot-based repetitions. In new radio (NR), a UE 102 may support multiple types of UL transmissions (PUSCH transmissions). The UL transmissions may include grant-based UL transmissions (e.g., UL transmissions with grant, dynamic grants, PUSCH transmissions with grant, PUSCH transmission scheduled by DCI (e.g., DCI format 0_0, DCI format 0_1, DCI format 0_2, DCI format 0_3)) and grant-free UL transmissions (e.g., UL transmissions without grant, configured grants, PUSCH transmissions with configured grant).

For grant-based transmission, PUSCH transmission is scheduled by DCI (e.g., the DCI format 0_0, the DCI format 0_1, the DCI format 0_2, and the DCI format 0_3 shown above). The PUSCH may be assigned (e.g., scheduled) by a DCI format 0_0/0_1/0_2/0_3 with CRC scrambled by C-RNTI, MCS-C-RNTI, a new-RNTI (e.g., a L-RNTI), TC-RNTI, or SP-CSI-RNTI. Some UE-specific PUSCH parameters may be configured by RRC (i.e., using the RRC message (the RRC signaling)). An example for RRC configuration is shown in Listing 3. For example, pusch-AggregationFactor in PUSCH-Config indicates number of repetitions for data. When the UE 102 is configured with pusch-AggregationFactor>1, the same symbol allocation may be applied across the pusch-AggregationFactor consecutive slots and the PUSCH may be limited to a single transmission layer. The UE 102 may repeat the transport block (TB) across the pusch-AggregationFactor consecutive slots applying the same symbol allocation in each slot. If the UE procedure for determining the slot configuration, determines symbols of a slot allocated for PUSCH as downlink symbols, the transmission on that slot may be omitted for multi-slot PUSCH transmission.

For the PUSCH retransmission scheduled by a PDCCH with CRC scrambled by CS-RNTI with NDI=1, the parameters in pusch-Config may be applied for the PUSCH transmission except for p0-NominalWithoutGrant, p0-PUSCH-Alpha, powerControl-LoopToUse, pathlossReferenceIndex, mcs-Table, mcs-TableTransformPrecoder and transformPrecoder, which may be provided in configuredGrantConfig.

For the PUSCH retransmission scheduled by a PDCCH with CRC scrambled by CS-RNTI with new data indicator (NDI) equal to 1 (i.e., NDI=1), if the UE 102 is configured with pusch-AggregationFactor, the same symbol allocation may be applied across the pusch-AggregationFactor consecutive slots and the PUSCH may be limited to a single transmission layer. The UE 102 may repeat the TB across the pusch-AggregationFactor consecutive slots applying the same symbol allocation in each slot.

Listing 3

```
-- ASN1START
-- TAG-PUSCH-CONFIG-START
PUSCH-Config ::=                            SEQUENCE {
    dataScramblingIdentityPUSCH                 INTEGER (0..1023)
                                                OPTIONAL, -- Need M
    txConfig                                    ENUMERATED {codebook,
                                                    nonCodebook}
                                                OPTIONAL, -- Need S
    dmrs-UplinkForPUSCH-MappingTypeA            SetupRelease {
                                                DMRS-UplinkConfig }
                                                OPTIONAL, -- Need M
    dmrs-UplinkForPUSCH-MappingTypeB            SetupRelease {
                                                DMRS-UplinkConfig }
                                                OPTIONAL, -- Need M
    pusch-PowerControl                          PUSCH-PowerControl
                                                OPTIONAL, -- Need M
    frequencyHopping                            ENUMERATED {mode1,
mode2}
                                                OPTIONAL, -- Need S
    frequencyHoppingOffsetLists                 SEQUENCE (SIZE (1..4) )
OF
        INTEGER (1..
maxNrofPhysicalResourceBlocks–1)
                                                OPTIONAL, -- Need M
    resourceAllocation                          ENUMERATED {
resourceAllocationType0,
resourceAllocationType1,
                                                    dynamicSwitch},
    pusch-TimeDomainAllocationList              SetupRelease {
        PUSCH-TimeDomainResourceAllocationList }
                                                OPTIONAL, -- Need M
    pusch-AggregationFactor                     ENUMERATED { n2, n4,
n8 }
                                                OPTIONAL, -- Need S
    mcs-Table                                   ENUMERATED {qam256,
                                                    spare1}
                                                OPTIONAL, -- Need S
    mcs-TableTransformPrecoder                  ENUMERATED {qam256,
                                                    spare1}
                                                OPTIONAL, -- Need S
    transformPrecoder                           ENUMERATED {enabled,
                                                    disabled}
                                                OPTIONAL, -- Need S
    codebookSubset                              ENUMERATED {
        fullyAndPartialAndNonCoherent,
                                                    partialAndNonCoherent,
                                                    nonCoherent}
                                                OPTIONAL,    -- Cond codebookBased
    maxRank                                     INTEGER (1..4)
                                                OPTIONAL,    -- Cond codebookBased
    rbg-Size                                    ENUMERATED { config2}
                                                OPTIONAL, -- Need S
```

-continued

Listing 3

```
uci-OnPUSCH                         SetupRelease {
                                        UCI-OnPUSCH}
                                        OPTIONAL, -- Need M
tp-pi2BPSK                          ENUMERATED {enabled}
                                        OPTIONAL, -- Need S
    ...
}
UCI-OnPUSCH ::=                     SEQUENCE {
    betaOffsets                         CHOICE {
        dynamic                             SEQUENCE (SIZE (4) ) OF
                                                BetaOffsets,
        semiStatic                          BetaOffsets
    }
                                        OPTIONAL, -- Need M
    scaling                         ENUMERATED { f0p5, f0p65,
                                        f0p8, f1 }
}
-- TAG-PUSCH-CONFIG-STOP
-- ASN1STOP
```

In some examples, the UE scheduling module 126 may perform time-domain resource allocation. Approaches to determine time-domain resource allocation (TDRA) for one or more (e.g., all) channels are described herein.

As mentioned above, a field named Time domain resource assignment may be used to indicate time-domain resource allocation of a slot(s) and/or a mini-slot(s) and/or a symbol(s). It should be noted that this field may have a different name in some specifications relating to, for example, resource allocation (RA). For example, the Time domain resource assignment field value m may provide (e.g., be used for indicating) a row index m+1 to an allocation table. The determination of the used resource allocation table may be as defined based on some rules. The indexed row may define a value(s) of the slot offset(s) and/or the mini-slot offset(s) and/or the symbol offset(s) (e.g., $K_0$ for downlink, and/or $K_2$ for uplink). The indexed row may define the start and length indicator (SLIV), or may directly indicate the start symbol S and the allocation length L. The indexed row may define a value(s) of the PDSCH mapping and/or the PUSCH mapping type to be assumed in the PDSCH/PUSCH reception. The indexed row may define a value(s) of the number of repetitions to be assumed in the PDSCH/PUSCH reception. For example, the Time domain resource assignment field may be used to indicate a time domain relation between the PDCCH and the PDSCH (e.g., $K_0$ and/or a position(s) of the slot(s), the mini-slot(s), and/or the symbols(s) for the PDSCH scheduled by using the corresponding PDCCH), or a time domain relation between the PDCCH and the PUSCH (e.g., $K_2$ and/or a position(s) of the slot(s), the mini-slot(s), and/or the symbols(s) for the PUSCH scheduled by using the corresponding PDCCH), or a time domain relation between a reference point (e.g., period boundary, slot boundary, subframe boundary, system frame number (SFN)=0, the starting symbol of the PDCCH monitoring occasion in which the DL/UL assignment/grant is detected, etc.) and PUSCH/PDSCH. $K_0$ may denote delay between a DL grant (e.g., PDCCH, DCI) and corresponding DL data (e.g., PDSCH) reception. $K_2$ may denote a delay between an UL grant (e.g., PDCCH, DCI) reception in the DL and corresponding UL data (e.g., PUSCH) transmission. Note that $K_0$ and $K_2$ above may be defined in units of slots, sub-slot(s) and/or symbol(s).

The Time domain resource assignment field may be included in downlink control information (DCI) used for uplink (UL) grant and/or downlink (DL) assignment. For instance, the Time domain resource assignment field may be included in a DCI format(s) (e.g., the DCI format 0_0 and/or the DCI format 0_1 and/or the DCI format 0_2 and/or the DCI format 0_3) that is used for scheduling of the PUSCH. The Time domain resource assignment field may be included in a DCI format(s) (e.g., the DCI format 1_0 and/or the DCI format 1_1 and/or the DCI format 1_2 and/or the DCI format 1_3) that is used for scheduling of the PDSCH. The Time domain resource assignment field may be included in DCI (e.g., the DCI format 0_0, the DCI format 0_1, the DCI format 0_2 and/or the DCI format 0_3) used for activation of configured grant type 2. The Time domain resource assignment field may be included in DCI (e.g., the DCI format 1_0, the DCI format 1_1, the DCI format 1_2 and/or the DCI format 1_3) used for activation of DL semi-persistent scheduling (SPS). The Time domain resource assignment field (which may be referred to with a different name, e.g., timeDomainAllocation) may be included in radio resource control (RRC) signaling for configured grant type 1.

The network may indicate in the downlink/uplink (DL/UL) assignment which of the configured time domain allocations (e.g., allocation table) the UE 102 may apply for that DL/UL assignment. There may be several defaulted allocation table(s) specified. In some examples, the default allocation table(s) may be defined only for the 4-bit Time domain resource assignment field. For instance, the default allocation table(s) may have 16 entities. And, the default allocation table(s) may also be defined for the more than 4-bit Time domain resource assignment field. For instance, in a case of a condition(s) that the default allocation table is used, the 4-bit Time domain resource assignment field may be always used for time-domain resource allocation (RA) (for the downlink, and/or for the uplink, for instance). The allocation table may be configured by using information included in the RRC message. Some examples are shown in the following listings. Listing (4) illustrates an example of a PUSCH-TimeDomainResourceAllocation information element. Listing (5) illustrates an example of a PDSCH-TimeDomainResourceAllocationList information element.

Listing 4

```
-- ASN1START
-- TAG-PUSCH-TIMEDOMAINRESOURCEALLOCATIONLIST-START
PUSCH-TimeDomainResourceAllocationList ::= SEQUENCE
(SIZE(1..maxNrofUL-Allocations)) OF PUSCH-TimeDomainResourceAllocation
PUSCH-TimeDomainResourceAllocation ::= SEQUENCE {
    k2                          INTEGER(0..32)
        OPTIONAL, -- Need S
    mappingType                 ENUMERATED {typeA, typeB},
    startSymbolAndLength        INTEGER (0..127)
}
-- TAG-PUSCH-TIMEDOMAINRESOURCEALLOCATIONLIST-STOP
-- ASN1STOP
```

Listing-5

```
-- ASN1START
-- TAG-PDSCH-TIMEDOMAINRESOURCEALLOCATIONLIST-START
PDSCH-TimeDomainResourceAllocationList ::= SEQUENCE
(SIZE(1..maxNrofDL-Allocations)) OF PDSCH-TimeDomainResourceAllocation
PDSCH-TimeDomainResourceAllocation ::= SEQUENCE {
    k0                          INTEGER(0..32)
        OPTIONAL, -- Need S
    mappingType                 ENUMERATED {typeA, typeB},
    startSymbolAndLength        INTEGER (0..127)
}
-- TAG-PDSCH-TIMEDOMAINRESOURCEALLOCATIONLIST-STOP
-- ASN1STOP
```

The UE 102 may determine the number of bits (e.g., the bit width, the size) of the Time domain resource assignment field based on the number of entries in the allocation table. As described above, the number of entries may be determined (e.g., configured) based on the information included in the RRC message. In some examples, the maximum number of entries in the configured allocation table (e.g., maxNrofUL-Allocations or maxNrofDL-Allocations) may be set as 16 (or 32 or 64). In some examples, the maximum number of entries in the defaulted allocation table(s) may be 16 (or 32 or 64). In this case, the number of bits (e.g., the maximum number of bits) of the Time domain resource assignment field may be 4 (or 5 or 6). For example, the number of bits of the Time domain resource assignment field in a fallback DCI (e.g., the DCI Format 0_0, or the DCI Format 1_0) may be 4. The number of bits of the Time domain resource assignment field in non-fallback DCI (e.g., the DCI Format 0_1, or the DCI Format 1_1, the DCI Format 0_2, or the DCI Format 1_2, the DCI Format 0_3, or the DCI Format 1_3) may be 0, 1, 2, 3, 4, 5 or 6.

In some examples, 16 entries (i.e., 16 time domain allocations) in the allocation table may not be enough to meet the flexible scheduling, dynamic indication of the number of repetitions, or other requirements. Thus, in a different implementation, an allocation table with more than 16 entries may be configured by using information included in the RRC message. For instance, the number of entries (e.g., the maximum number of entries) in the configured allocation table (e.g., maxNrofUL-Allocations1 or maxNrofDL-Allocations1) may be set greater than 16 (e.g., 32 or 64). Additionally or alternatively, one or more defaulted allocation tables with more than 16 entries may be defined. In this case, more than 4 bits may be needed for the Time domain resource assignment field. For instance, the UE 102 may need to identify a 4-bit Time domain resource assignment field and/or a more than 4-bit Time domain resource assignment field (e.g., 5-bit or 6-bit Time domain resource assignment field).

As mentioned above, to support the dynamic indication of the number of repetitions for dynamic grant and/or configured grant, the number of repetitions may be jointly coded with SLIV in a TDRA table, by adding an additional column for the number of repetitions in the TDRA table (default table(s) and/or RRC configured table(s)). The maximum TDRA table size may be increased to 64. Start symbol S and length L may be used instead of SLIV. The TDRA table may be configured per DCI format. Some examples are shown in the following listings. Listing 6 illustrates an example of a PUSCH-TimeDomainResourceAllocation-ForDCIformat0_1 (as well as PUSCH-TimeDomainResourceAllocationList-ForDCIformat0_1) information element. Listing 7 illustrates an example of a PUSCH-TimeDomainResourceAllocation-ForDCIformat0_2 (as well as PUSCH-TimeDomainResourceAllocationList-ForDCIformat0_2) information element. Listing 8 illustrates an example of a PUSCH-TimeDomainResourceAllocation-ForDCIformat0_2 (as well as PUSCH-TimeDomainResourceAllocationList-ForDCIformat0_2) information element with separate start symbol S and length L instead of startSymbolAndLength SLIV.

Listing 6

```
-- ASN1START
--
TAG-PUSCH-TIMEDOMAINRESOURCEALLOCATIONLIST-
FORDCIFORMAT0_1-START
PUSCH-TimeDomainResourceAllocationList-ForDCIformat0_1 ::= SEQUENCE
```

Listing 6

```
(SIZE(1..maxNrofUL-Allocations)) OF PUSCH-TimeDomainResourceAllocation
PUSCH-TimeDomainResourceAllocation-ForDCIformat0_1 ::= SEQUENCE {
    k2                              INTEGER(0..32)
        OPTIONAL, -- Need S
    mappingType                     ENUMERATED {typeA, typeB},
    startSymbolAndLength            INTEGER (0..127)
    numberofrepetitions             INTEGER (0..8)
}
--TAG-PUSCH-TIMEDOMAINRESOURCEALLOCATIONLIST-
FORDCIFORMAT0_1-STOP
-- ASN1STOP
```

Listing 7

```
-- ASN1START
--TAG-PUSCH-TIMEDOMAINRESOURCEALLOCATIONLIST-
FORDCIFORMAT0_2-START
PUSCH-TimeDomainResourceAllocationList-ForDCIformat0_2 ::= SEQUENCE
(SIZE(1..maxNrofUL-Allocations)) OF PUSCH-TimeDomainResourceAllocation
PUSCH-TimeDomainResourceAllocation-ForDCIformat0_2 ::= SEQUENCE {
    k2                              INTEGER(0..32)
        OPTIONAL, -- Need S
    mappingType                     ENUMERATED {typeA, typeB},
    startSymbolAndLength            INTEGER (0..127)
    numberofrepetitions             INTEGER (0..8)
}
--TAG-PUSCH-TIMEDOMAINRESOURCEALLOCATIONLIST-
FORDCIFORMAT0_2-STOP
-- ASN1STOP
```

Listing 8

```
-- ASN1START
--TAG-PUSCH-TIMEDOMAINRESOURCEALLOCATIONLIST-
FORDCIFORMAT0_2-START
PUSCH-TimeDomainResourceAllocationList-ForDCIformat0_2 ::= SEQUENCE
(SIZE(1..maxNrofUL-Allocations)) OF PUSCH-TimeDomainResourceAllocation
PUSCH-TimeDomainResourceAllocation-ForDCIformat0_2 ::= SEQUENCE {
    k2                              INTEGER(0..32)
        OPTIONAL,                   -- Need S
    mappingType                     ENUMERATED {typeA, typeB},
    startSymbol                     INTEGER (0..13)
    Length                          INTEGER (1..14)
    numberofrepetitions             INTEGER (0..8)
}
--TAG-PUSCH-TIMEDOMAINRESOURCEALLOCATIONLIST-
FORDCIFORMAT0_2-STOP
-- ASN1STOP
```

To support NR light, a new TDRA table may be introduced/configured for NR light service and/or DCI format 0_3/1_3. The maximum TDRA table size may be increased to 64. Start symbol S and length L may be used instead of SLIV. The TDRA table may be configured per DCI format or per specific NR light service. Some examples are shown in the following listings. Listing 9 illustrates an example of a PUSCH-TimeDomainResourceAllocation-ForNR_light (as well as PUSCH-TimeDomainResourceAllocationList-ForNR_light) information element. Listing 10 illustrates an example of a PUSCH-TimeDomainResourceAllocation-ForDCIformat0_3 (as well as PUSCH-TimeDomainResourceAllocationList-ForDCIformat0_3) information element. Listing 11 illustrates an example of a PUSCH-TimeDomainResourceAllocation-ForDCIformat0_3 (as well as PUSCH-TimeDomainResourceAllocationList-ForDCIformat0_3) information element with separate start symbol S and length L instead of startSymbolAndLength SLIV. Additionally or alternatively, a default TDRA table be provided for NR light only.

Listing 9

```
-- ASN1START
--TAG-PUSCH-TIMEDOMAINRESOURCEALLOCATIONLIST-
FORDCIFORNR_LIGHT-START
```

Listing 9

```
PUSCH-TimeDomainResourceAllocationList-ForNR_light ::= SEQUENCE
(SIZE(1..maxNrofUL-Allocations)) OF PUSCH-TimeDomainResourceAllocation
PUSCH-TimeDomainResourceAllocation-ForNR_light ::= SEQUENCE {
   k2                           INTEGER(0..32)
      OPTIONAL, -- Need S
   mappingType                  ENUMERATED {typeA, typeB},
   startSymbolAndLength         INTEGER (0..127)
   numberofrepetitions          INTEGER (0..8)
}
--TAG-PUSCH-TIMEDOMAINRESOURCEALLOCATIONLIST-
FORDCIFORNR_LIGHT-STOP
-- ASN1STOP
```

Listing 10

```
-- ASN1START
--TAG-PUSCH-TIMEDOMAINRESOURCEALLOCATIONLIST-
FORDCIFORMAT0_3-START
PUSCH-TimeDomainResourceAllocationList-ForDCIformat0_3 ::= SEQUENCE
(SIZE(1..maxNrofUL-Allocations)) OF PUSCH-TimeDomainResourceAllocation
PUSCH-TimeDomainResourceAllocation-ForDCIformat0_3 ::= SEQUENCE {
   k2                           INTEGER(0..32)
      OPTIONAL, -- Need S
   mappingType                  ENUMERATED {typeA, typeB},
   startSymbolAndLength         INTEGER (0..127)
   numberofrepetitions          INTEGER (0..8)
}
--TAG-PUSCH-TIMEDOMAINRESOURCEALLOCATIONLIST-
FORDCIFORMAT0_3-STOP
-- ASN1STOP
```

Listing 11

```
-- ASN1START
--TAG-PUSCH-TIMEDOMAINRESOURCEALLOCATIONLIST-
FORDCIFORMAT0_3-START
PUSCH-TimeDomainResourceAllocationList-ForDCIformat0_3 ::= SEQUENCE
(SIZE(1..maxNrofUL-Allocations)) OF PUSCH-TimeDomainResourceAllocation
PUSCH-TimeDomainResourceAllocation-ForDCIformat0_3 ::= SEQUENCE {
   k2                           INTEGER(0..32)
      OPTIONAL,                 -- Need S
   mappingType                  ENUMERATED {typeA, typeB},
   startSymbol                  INTEGER (0..13)
   Length                       INTEGER (1..14)
   numberofrepetitions          INTEGER (0..8)
}
--TAG-PUSCH-TIMEDOMAINRESOURCEALLOCATIONLIST-
FORDCIFORMAT0_3-STOP
-- ASN1STOP
```

As mentioned above, there may be multiple TDRA tables, e.g., PUSCH-TimeDomainResourceAllocationList in a UE-specific RRC message (e.g., PUSCH-Config), pusch-TimeDomainAllocationList provided in a common RRC message (e.g., pusch-ConfigCommon), PUSCH-TimeDomainResourceAllocationList-ForDCIformat0_1 in UE-specific RRC message (e.g., PUSCH-Config), PUSCH-TimeDomainResourceAllocationList-ForDCIformat0_2 in a UE-specific RRC message (e.g., PUSCH-Config), PUSCH-TimeDomainResourceAllocationList-ForDCIformat0_3 in a UE-specific RRC message (e.g., PUSCH-Config) and/or default TDRA table(s) defined. Examples of determination of the resource allocation table to be used for PUSCH are described here. For example, if the UE 102 detects DCI format 0_1 (in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_1 is configured, PUSCH-TimeDomainResourceAllocationList-ForDCIformat0_1 may be always applied for time domain resource allocation of the corresponding PUSCH transmission(s) (e.g., DG, CG Type 2, and/or retransmission of CG) scheduled (and/or activated) by the DCI format 0_1, regardless of whether other table(s) (e.g., PUSCH-TimeDomainResourceAllocationList in a UE-specific RRC message (e.g., PUSCH-Config), pusch-TimeDomainAllocationList provided in a common RRC message (e.g., pusch-ConfigCommon), PUSCH-TimeDomainResourceAllocationList-ForDCIformat0_2 in a UE-specific RRC message (e.g., PUSCH-Config)) is configured or not.

If the UE 102 detects DCI format 0_2 (in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_2 is configured, PUSCH-TimeDomainResourceAllocationList-ForDCIformat0_2 may be always applied for time domain resource allocation of the corresponding PUSCH transmission(s) (e.g., DG, CG Type 2, and/or retransmission of CG) scheduled (and/or activated) by the DCI format 0_2, regardless of whether other table(s) (e.g., PUSCH-TimeDomainResourceAllocationList in a UE-specific RRC message (e.g., PUSCH-Config), pusch-TimeDomainAllocationList provided in a common RRC message (e.g., pusch-ConfigCommon), PUSCH-TimeDomainResourceAllocationList-ForDCIformat0_1 in a UE-specific RRC message (e.g., PUSCH-Config)) is configured or not. If the UE 102 detects DCI format 0_0 (in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_1 and/or PUSCH-TimeDomainResourceAllocationList-ForDCIformat0_2 is configured, PUSCH-TimeDomainResourceAllocationList-ForDCIformat0_1 and/or PUSCH-TimeDomainResourceAllocationList-ForDCIformat0_2 may not be applied for time domain resource allocation of the corresponding PUSCH transmission(s) (e.g., DG, CG Type 2, and/or retransmission of CG) scheduled (and/or activated) by the DCI format 0_0.

If the UE 102 detects DCI format 0_3 (in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_3 is configured, PUSCH-TimeDomainResourceAllocationList-ForDCIformat0_3 may be always applied for time domain resource allocation of the corresponding PUSCH transmission(s) (e.g., DG, CG Type 2, and/or retransmission of CG) scheduled (and/or activated) by the DCI format 0_3, regardless of whether other table(s) (e.g., PUSCH-TimeDomainResourceAllocationList in a UE-specific RRC message (e.g., PUSCH-Config), pusch-TimeDomainAllocationList provided in a common RRC message (e.g., pusch-ConfigCommon), PUSCH-TimeDomainResourceAllocationList-ForDCIformat0_1 in a UE-specific RRC message (e.g., PUSCH-Config)), PUSCH-TimeDomainResourceAllocationList-ForDCIformat0_2 in a UE-specific RRC message (e.g., PUSCH-Config)) is configured or not. If the UE 102 detects DCI format 0_0 (in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_1 and/or PUSCH-TimeDomainResourceAllocationList-ForDCIformat0_2 and/or PUSCH-TimeDomainResourceAllocationList-ForDCIformat0_3 is configured, PUSCH-TimeDomainResourceAllocationList-ForDCIformat0_1 and/or PUSCH-TimeDomainResourceAllocationList-ForDCIformat0_2 and/or PUSCH-TimeDomainResourceAllocationList-ForDCIformat0_3 may not be applied for time domain resource allocation of the corresponding PUSCH transmission(s) (e.g., DG, CG Type 2, and/or retransmission of CG) scheduled (and/or activated) by the DCI format 0_0.

If the UE 102 detects DCI format 0_0 (in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList in a UE-specific RRC message (e.g., PUSCH-Config) is configured, PUSCH-TimeDomainResourceAllocationList in a UE-specific RRC message (e.g., PUSCH-Config) may be applied for time domain resource allocation of the corresponding PUSCH transmission(s) (e.g., DG, CG Type 2, and/or retransmission of CG) scheduled (and/or activated) by the DCI format 0_0, regardless of whether PUSCH-TimeDomainResourceAllocationList in a common RRC message (e.g., PUSCH-ConfigCommon) is configured or not. If the UE 102 detects DCI format 0_1 (e.g., in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_1 is not configured but PUSCH-TimeDomainResourceAllocationList in a UE-specific RRC message (e.g., PUSCH-Config) is configured, PUSCH-TimeDomainResourceAllocationList in a UE-specific RRC message (e.g., PUSCH-Config) may be applied for time domain resource allocation of the corresponding PUSCH transmission(s) (e.g., DG, CG Type 2, and/or retransmission of CG) scheduled (and/or activated) by the DCI format 0_1. If the UE 102 detects DCI format 0_2 (e.g., in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_2 is not configured but PUSCH-TimeDomainResourceAllocationList in a UE-specific RRC message (e.g., PUSCH-Config) is configured, PUSCH-TimeDomainResourceAllocationList in a UE-specific RRC message (e.g., PUSCH-Config) may be applied for time domain resource allocation of the corresponding PUSCH transmission(s) (e.g., DG, CG Type 2, and/or retransmission of CG) scheduled (and/or activated) by the DCI format 0_2. If the UE 102 detects DCI format 0_3 (e.g., in any common search space associated with CORESET 0, in any common search space not associated with CORESET 0, and/or UE specific search space, for instance) for scheduling of a PUSCH (and/or activation of configured grant Type 2) and PUSCH-TimeDomainResourceAllocationList-ForDCIformat0_3 is not configured but PUSCH-TimeDomainResourceAllocationList in a UE-specific RRC message (e.g., PUSCH-Config) is configured, PUSCH-TimeDomainResourceAllocationList in a UE-specific RRC message (e.g., PUSCH-Config) may be applied for time domain resource allocation of the corresponding PUSCH transmission(s) (e.g., DG, CG Type 2, and/or retransmission of CG) scheduled (and/or activated) by the DCI format 0_3.

If the UE 102 detects a DCI format (e.g., DCI format 0_0, DCI format 0_1 or DCI format 0_2) in any common search space associated with CORESET 0 for scheduling of a PUSCH (and/or activation of configured grant Type 2) and there is no RRC configured TDRA table(s), the default table may be applied for time domain resource allocation of the corresponding PUSCH transmission(s) (e.g., DG, CG Type 2, and/or retransmission of CG) scheduled (and/or activated)

by the DCI format. If the UE 102 detects a DCI format (e.g., DCI format 0_0, DCI format 0_1 or DCI format 0_2) in any common search space associated with CORESET 0 for scheduling of a PUSCH (and/or activation of configured grant Type 2) and only pusch-TimeDomainAllocationList in a common RRC message (e.g., pusch-ConfigCommon) is configured, pusch-TimeDomainAllocationList in a common RRC message (e.g., pusch-ConfigCommon) may be applied for time domain resource allocation of the corresponding PUSCH transmission(s) (e.g., DG, CG Type 2, and/or retransmission of CG) scheduled (and/or activated) by the DCI format.

If the UE 102 detects a DCI format (e.g., DCI format 0_0, DCI format 0_1, DCI format 0_2 or DCI format 0_3) in any common search space not associated with CORESET 0 and/or UE specific search space for scheduling of a PUSCH (and/or activation of configured grant Type 2) and there is no RRC configured TDRA table(s), the default table may be applied for time domain resource allocation of the corresponding PUSCH transmission(s) (e.g., DG, CG Type 2, and/or retransmission of CG) scheduled (and/or activated) by the DCI format. If the UE 102 detects a DCI format (e.g., DCI format 0_0, DCI format 0_1, DCI format 0_2 or DCI format 0_3) in any common search space not associated with CORESET 0 and/or UE specific search space for scheduling of a PUSCH (and/or activation of configured grant Type 2) and only pusch-TimeDomainAllocationList in a common RRC message (e.g., pusch-ConfigCommon) is configured, pusch-TimeDomainAllocationList in a common RRC message (e.g., pusch-ConfigCommon) may be applied for time domain resource allocation of the corresponding PUSCH transmission(s) (e.g., DG, CG Type 2, and/or retransmission of CG) scheduled (and/or activated) by the DCI format.

The selection of TDRA table may be determined by RNTI. If the UE 102 detects a DCI format (e.g., DCI format 0_0, DCI format 0_1, DCI format 0_2 or DCI format 0_3) with CRC scrambled by a NR light specific RNTI (e.g., L-RNTI, L-UL-RNTI), NR light specific TDRA table (e.g., PUSCH-TimeDomainResourceAllocationList-ForDCIformat0_3, PUSCH-TimeDomainResourceAllocationList-ForNR_light, the default table dedicated for NR light) may be applied for time domain resource allocation of the corresponding PUSCH transmission(s) (e.g., DG, CG Type 2, and/or retransmission of CG) scheduled (and/or activated) by the DCI format.

To support NR light, a new TDRA table may be introduced/configured for NR light service and/or DCI format 0_3/1_3. The maximum TDRA table size may be increased to 64. Start symbol S and length L may be used instead of SLIV. The TDRA table may be configured per DCI format or per specific NR light service. Some examples are shown in the following listings. Listing 12 illustrates an example of a PDSCH-TimeDomainResourceAllocation-ForNR_light (as well as PDSCH-TimeDomainResourceAllocationList-ForNR_light) information element. Listing 13 illustrates an example of a PDSCH-TimeDomainResourceAllocation-ForDCIformat1_3 (as well as PDSCH-TimeDomainResourceAllocationList-ForDCIformat1_3) information element. Listing 14 illustrates an example of a PUSCH-TimeDomainResourceAllocation-ForDCIformat1_3 (as well as PDSCH-TimeDomainResourceAllocationList-ForDCIformat1_3) information element with separate start symbol S and length L instead of startSymbolAndLength SLIV. Additionally or alternatively, a default TDRA table (for downlink) be provided for NR light only.

Listing 12

```
-- ASN1START
--TAG-PDSCH-TIMEDOMAINRESOUECEALLOCATIONLIST-
FORDCIFORNR_LIGHT-START
PDSCH-TimeDomainResourceAllocationList-ForNR_light ::= SEQUENCE
(SIZE(1..maxNrofUL-Allocations)) OF PDSCH-TimeDomainResourceAllocation
PDSCH-TimeDomainResourceAllocation-ForNR_light ::= SEQUENCE {
    k0                          INTEGER(0..32)
       OPTIONAL, -- Need S
    mappingType                 ENUMERATED {typeA, typeB},
    startSymbolAndLength        INTEGER (0..127)
    numberofrepetitions         INTEGER (0..8)
}
--TAG-PDSCH-TIMEDOMAINRESOURCEALLOCATIONLIST-
FORDCIFORNR_LIGHT-STOP
-- ASN1STOP
```

Listing 13

```
-- ASN1START
--TAG-PDSCH-TIMEDOMAINRESOURCEALLOCATIONLIST-
FORDCIFORMAT1_3-START
PDSCH-TimeDomainResourceAllocationList-ForDCIformat1_3 ::= SEQUENCE
(SIZE(1..maxNrofUL-Allocations)) OF PDSCH-TimeDomainResourceAllocation
PDSCH-TimeDomainResourceAllocation-ForDCIformat1_3 ::= SEQUENCE {
    k0                          INTEGER(0..32)
       OPTIONAL, -- Need S
    mappingType                 ENUMERATED {typeA, typeB},
    startSymbolAndLength        INTEGER (0..127)
    numberofrepetitions         INTEGER (0..8)
}
--TAG-PDSCH-TIMEDOMAINRESOURCEALLOCATIONLIST-
```

Listing 13

```
FORDCIFORMAT1_3-STOP
-- ASN1STOP
```

Listing 14

```
-- ASN1START
--TAG-PDSCH-TIMEDOMAINRESOURCEALLOCATIONLIST-
FORDCIFORMAT1_3-START
PDSCH-TimeDomainResourceAllocationList-ForDCIformat1_3 ::= SEQUENCE
(SIZE(1..maxNrofUL-Allocations)) OF PDSCH-TimeDomainResourceAllocation
PUSCH-TimeDomainResourceAllocation-ForDCIformat1_3 ::= SEQUENCE {
    k0                         INTEGER(0..32)
        OPTIONAL,              -- Need S
    mappingType                ENUMERATED {typeA, typeB},
    startSymbol                INTEGER (0..13)
    Length                     INTEGER (1..14)
    numberofrepetitions        INTEGER (0..8)
}
--TAG-PDSCH-TIMEDOMAINRESOURCEALLOCATIONLIST-
FORDCIFORMAT1_3-STOP
-- ASN1STOP
```

As mentioned above, there may be multiple TDRA tables for downlink, e.g., PDSCH-TimeDomainResourceAllocationList in a UE-specific RRC message (e.g., PDSCH-Config), pdsch-TimeDomainAllocationList provided in a common RRC message (e.g., pdsch-ConfigCommon), PDSCH-TimeDomainResourceAllocationList-ForDCIformat1_1 in UE-specific RRC message (e.g., PDSCH-Config), PDSCH-TimeDomainResourceAllocationList-ForDCIformat1_2 in a UE-specific RRC message (e.g., PDSCH-Config), PDSCH-TimeDomainResourceAllocationList-ForDCIformat1_3 in a UE-specific RRC message (e.g., PDSCH-Config) and/or default TDRA table(s) defined. Examples of determination of the resource allocation table to be used for PDSCH are described here. For example, if the UE 102 detects DCI format 1_1 (in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_1 is configured, PDSCH-TimeDomainResourceAllocationList-ForDCIformat1_1 may be always applied for time domain resource allocation of the corresponding PDSCH transmission(s) (e.g., DG, SPS, and/or retransmission of SPS) scheduled (and/or activated) by the DCI format 1_1, regardless of whether other table(s) (e.g., PDSCH-TimeDomainResourceAllocationList in a UE-specific RRC message (e.g., PDSCH-Config), pdsch-TimeDomainAllocationList provided in a common RRC message (e.g., pdsch-ConfigCommon), PUSCH-TimeDomainResourceAllocationList-ForDCIformat1_2 in a UE-specific RRC message (e.g., PDSCH-Config)) is configured or not.

If the UE 102 detects DCI format 1_2 (in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_2 is configured, PDSCH-TimeDomainResourceAllocationList-ForDCIformat1_2 may be always applied for time domain resource allocation of the corresponding PDSCH transmission(s) (e.g., DG, SPS, and/or retransmission of SPS) scheduled (and/or activated) by the DCI format 1_2, regardless of whether other table(s) (e.g., PDSCH-TimeDomainResourceAllocationList in a UE-specific RRC message (e.g., PDSCH-Config), pdsch-TimeDomainAllocationList provided in a common RRC message (e.g., pdsch-ConfigCommon), PDSCH-TimeDomainResourceAllocationList-ForDCIformat1_1 in a UE-specific RRC message (e.g., PDSCH-Config)) is configured or not. If the UE 102 detects DCI format 1_0 (in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_1 and/or PDSCH-TimeDomainResourceAllocationList-ForDCIformat1_2 is configured, PDSCH-TimeDomainResourceAllocationList-ForDCIformat1_1 and/or PDSCH-TimeDomainResourceAllocationList-ForDCIformat1_2 may not be applied for time domain resource allocation of the corresponding PDSCH transmission(s) (e.g., DG, SPS, and/or retransmission of SPS) scheduled (and/or activated) by the DCI format 1_0.

If the UE 102 detects DCI format 1_3 (in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_3 is configured, PDSCH-TimeDomainResourceAllocationList-ForDCIformat1_3 may be always applied for time domain resource allocation of the corresponding PDSCH transmission(s) (e.g., DG, SPS, and/or retransmission of SPS) scheduled (and/or activated) by the DCI format 1_3, regardless of whether other table(s) (e.g., PDSCH-TimeDomainResourceAllocationList in a UE-specific RRC message (e.g., PDSCH-Config), pdsch-TimeDomainAllocationList provided in a common RRC message (e.g., pdsch-ConfigCommon), PDSCH-TimeDomainResourceAllocationList-ForDCIformat1_1 in a UE-specific RRC message (e.g., PDSCH-Config)), PDSCH-TimeDomainResourceAllocationList-ForDCIformat1_2 in a UE-specific RRC message (e.g., PDSCH-Config)) is configured or not. If the UE 102 detects DCI format 1_0 (in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_1 and/or PDSCH-TimeDomainResourceAllocationList-ForDCIformat1_2 and/or PDSCH-TimeDomainResourceAllocationList-ForDCIformat1_3 is configured, PDSCH-TimeDomainResourceAllocationList-ForDCIformat1_1 and/or PDSCH-TimeDomainResourceAllocationList-ForDCIformat1_2 and/or PDSCH-TimeDomainResourceAllocationList-ForDCIformat1_3 may not be applied for time domain resource allocation of the corresponding PDSCH transmission(s) (e.g., DG, SPS, and/or retransmission of SPS) scheduled (and/or activated) by the DCI format 1_0.

If the UE 102 detects DCI format 1_0 (in any common search space associated with CORESET 0, in any common search space not associated with CORESET 0, and/or UE specific search space, for instance) for scheduling of a PDSCH (and/or activation of SPS) and PDSCH-TimeDomainResourceAllocationList in a UE-specific RRC message (e.g., PDSCH-Config) is configured, PDSCH-TimeDomainResourceAllocationList in a UE-specific RRC message (e.g., PDSCH-Config) may be applied for time domain resource allocation of the corresponding PDSCH transmission(s) (e.g., DG, SPS, and/or retransmission of SPS) scheduled (and/or activated) by the DCI format 1_0, regardless of whether PDSCH-TimeDomainResourceAllocationList in a common RRC message (e.g., PDSCH-ConfigCommon) is configured or not. If the UE 102 detects DCI format 1_1 (e.g., in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_1 is not configured but PDSCH-TimeDomainResourceAllocationList in a UE-specific RRC message (e.g., PDSCH-Config) is configured, PDSCH-TimeDomainResourceAllocationList in a UE-specific RRC message (e.g., PDSCH-Config) may be applied for time domain resource allocation of the corresponding PDSCH transmission(s) (e.g., DG, SPS, and/or retransmission of SPS) scheduled (and/or activated) by the DCI format 1_1. If the UE 102 detects DCI format 1_2 (e.g., in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_2 is not configured but PDSCH-TimeDomainResourceAllocationList in a UE-specific RRC message (e.g., PDSCH-Config) is configured, PDSCH-TimeDomainResourceAllocationList in a UE-specific RRC message (e.g., PDSCH-Config) may be applied for time domain resource allocation of the corresponding PDSCH transmission(s) (e.g., DG, SPS, and/or retransmission of SPS) scheduled (and/or activated) by the DCI format 1_2. If the UE 102 detects DCI format 1_3 (e.g., in any common search space associated with CORESET 0, in any common search space not associated with CORESET 0, and/or UE specific search space, for instance) for scheduling of a PDSCH (and/or activation of SPS) and PDSCH-TimeDomainResourceAllocationList-ForDCIformat1_3 is not configured but PDSCH-TimeDomainResourceAllocationList in a UE-specific RRC message (e.g., PDSCH-Config) is configured, PDSCH-TimeDomainResourceAllocationList in a UE-specific RRC message (e.g., PDSCH-Config) may be applied for time domain resource allocation of the corresponding PDSCH transmission(s) (e.g., DG, SPS, and/or retransmission of SPS) scheduled (and/or activated) by the DCI format 1_3.

If the UE 102 detects a DCI format (e.g., DCI format 1_0, DCI format 1_1 or DCI format 1_2) in any common search space associated with CORESET 0 for scheduling of a PDSCH (and/or activation of SPS) and there is no RRC configured TDRA table(s), the default table may be applied for time domain resource allocation of the corresponding PDSCH transmission(s) (e.g., DG, SPS, and/or retransmission of SPS) scheduled (and/or activated) by the DCI format.

If the UE 102 detects a DCI format (e.g., DCI format 1_0, DCI format 1_1 or DCI format 1_2) in any common search space associated with CORESET 0 for scheduling of a PDSCH (and/or activation of SPS) and only pusch-TimeDomainAllocationList in a common RRC message (e.g., pdsch-ConfigCommon) is configured, pdsch-TimeDomainAllocationList in a common RRC message (e.g., pdsch-ConfigCommon) may be applied for time domain resource allocation of the corresponding PDSCH transmission(s) (e.g., DG, SPS, and/or retransmission of SPS) scheduled (and/or activated) by the DCI format.

If the UE 102 detects a DCI format (e.g., DCI format 1_0, DCI format 1_1, DCI format 1_2 or DCI format 1_3) in any common search space not associated with CORESET 0 and/or UE specific search space for scheduling of a PDSCH (and/or activation of SPS) and there is no RRC configured TDRA table(s), the default table may be applied for time domain resource allocation of the corresponding PDSCH transmission(s) (e.g., DG, SPS, and/or retransmission of SPS) scheduled (and/or activated) by the DCI format. If the UE 102 detects a DCI format (e.g., DCI format 1_0, DCI format 1_1, DCI format 1_2 or DCI format 1_3) in any common search space not associated with CORESET 0 and/or UE specific search space for scheduling of a PDSCH (and/or activation of SPS) and only pdsch-TimeDomainAllocationList in a common RRC message (e.g., pdsch-ConfigCommon) is configured, pdsch-TimeDomainAllocationList in a common RRC message (e.g., pdsch-ConfigCommon) may be applied for time domain resource allocation of the corresponding PDSCH transmission(s) (e.g., DG, SPS, and/or retransmission of SPS) scheduled (and/or activated) by the DCI format.

The selection of TDRA table may be determined by RNTI. If the UE 102 detects a DCI format (e.g., DCI format 1_0, DCI format 1_1, DCI format 1_2 or DCI format 1_3) with CRC scrambled by a NR light specific RNTI (e.g., L-RNTI, L-DL-RNTI), NR light specific TDRA table (e.g., PDSCH-TimeDomainResourceAllocationList-ForDCIformat1_3, PDSCH-TimeDomainResourceAllocationList-ForNR_light, the default table dedicated for NR light) may be applied for time domain resource allocation of the corresponding PDSCH transmission(s) (e.g., DG, SPS, and/or retransmission of SPS) scheduled (and/or activated) by the DCI format.

A set of PDCCH candidates for a UE 102 to monitor may be defined in terms of PDCCH search space sets. A search space set may be a common search space set or a UE-specific search space set. A UE 102 may monitor PDCCH candidates in one or more of the search spaces sets including a Type3-PDCCH common search space set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, new RNTI (e.g., L-RNTI, L-UL-RNTI, L-DL-RNTI) or CS-RNTI(s); and a UE-specific search space set configured by SearchSpace in PDCCH-Config with searchSpaceType=ue-Specific for DCI formats with CRC scrambled by C-RNTI, MCS-C-RNTI, new RNTI (e.g., L-RNTI, L-UL-RNTI, L-DL-RNTI) or CS-RNTI(s). An example of SearchSpace configuration is shown in Listing 15.

Listing 15

```
-- ASN1START
-- TAG-SEARCHSPACE-START
SearchSpace ::=                            SEQUENCE {
    searchSpaceId                              SearchSpaceId,
    controlResourceSetId                       ControlResourceSetId
                                                   OPTIONAL, -- Cond SetupOnly
    monitoringSlotPeriodicityAndOffset             CHOICE {
        sl1                                            NULL,
        sl2                                            INTEGER (0..1),
        sl4                                            INTEGER (0..3),
        sl5                                            INTEGER (0..4),
        sl8                                            INTEGER (0..7),
        sl10                                           INTEGER (0..9),
        sl16                                           INTEGER (0..15),
        sl20                                           INTEGER (0..19),
        sl40                                           INTEGER (0..39),
        sl80                                           INTEGER (0..79),
        sl160                                          INTEGER (0..159),
        sl320                                          INTEGER (0..319),
        sl640                                          INTEGER (0..639),
        sl1280                                         INTEGER (0..1279),
        sl2560                                         INTEGER (0..2559)
    }                                          OPTIONAL, -- Cond Setup
    duration                                   INTEGER (2..2559)
                                                   OPTIONAL, -- Need R
    monitoringSymbolsWithinSlot                BIT STRING (SIZE (14) )
                                                   OPTIONAL, -- Cond Setup
    nrofCandidates                             SEQUENCE {
        aggregationLevel1                          ENUMERATED {n0, n1, n2,
                                                                n3, n4, n5,
                                                                n6, n8},
        aggregationLevel2                          ENUMERATED {n0, n1, n2,
                                                                n3, n4, n5,
                                                                n6, n8},
        aggregationLevel4                          ENUMERATED {n0, n1, n2,
                                                                n3, n4, n5,
                                                                n6, n8},
        aggregationLevel8                          ENUMERATED {n0, n1, n2,
                                                                n3, n4, n5,
                                                                n6, n8},
        aggregationLevel16                         ENUMERATED {n0, n1, n2,
                                                                n3, n4, n5,
                                                                n6, n8}
    }                                          OPTIONAL, -- Cond Setup
    searchSpaceType                            CHOICE {
        common                                     SEQUENCE {
            dci-Format0-0-AndFormat1-0                 SEQUENCE {
                ...
            }                                          OPTIONAL, -- Need R
            dci-Format2-0                              SEQUENCE {
                nrofCandidates-SFI                         SEQUENCE {
                    aggregationLevel1                          ENUMERATED {n1, n2}
                                                                   OPTIONAL, -- Need R
                    aggregationLevel2                          ENUMERATED {n1, n2}
                                                                   OPTIONAL, -- Need R
                    aggregationLevel4                          ENUMERATED {n1, n2}
                                                                   OPTIONAL, -- Need R
                    aggregationLevel8                          ENUMERATED {n1, n2}
                                                                   OPTIONAL, -- Need R
                    aggregationLevel16                         ENUMERATED {n1, n2}
                                                                   OPTIONAL -- Need R
                },
                ...
            }                                          OPTIONAL, -- Need R
            dci-Format2-1                              SEQUENCE {
                ...
            }
            dci-Format2-1*                             SEQUENCE {
                ...
            }                                          OPTIONAL, -- Need R
            dci-Format2-2                              SEQUENCE {
                ...
            }                                          OPTIONAL, -- Need R
```

| Listing 15 |
|---|
| ```
dci-Format2-3                   SEQUENCE {
    monitoringPeriodicity           ENUMERATED {n1, n2,
                                                n4, n5,
                                                n8, n10,
                                                n16, n20
                                    }
                                    OPTIONAL, -- Cond Setup
    nrofPDCCH-Candidates            ENUMERATED {n1, n2},
    ...
dci-Format0-3                   SEQUENCE {
    monitoringPeriodicity           ENUMERATED {n1, n2,
                                                n4, n5,
                                                n8, n10,
                                                n16, n20
                                    }
                                    OPTIONAL, -- Cond Setup
    nrofPDCCH-Candidates            ENUMERATED {n1, n2},
    ...
dci-Format1-3                   SEQUENCE {
    monitoringPeriodicity           ENUMERATED {n1, n2,
                                                n4, n5,
                                                n8, n10,
                                                n16, n20
                                    }
                                    OPTIONAL, -- Cond Setup
    nrofPDCCH-Candidates            ENUMERATED (n1, n2},
    ...
    }                               OPTIONAL -- Need R
},
ue-Specific                     SEQUENCE {
    dci-Formats                     ENUMERATED {
                                        formats0-0-And-1-0,
                                        formats0-1-And-1-1,
                                        formats0-2-And-1-2,
                                    formats0-3-And-1-3},
    ...
    }
}                               OPTIONAL -- Cond Setup
}
-- TAG-SEARCHSPACE-STOP
-- ASN1STOP_
``` |

UE may monitor a set of PDCCH candidates in one or more CORESETs on the active DL BWP on each activated serving cell configured with PDCCH monitoring according to corresponding search space sets where monitoring implies decoding each PDCCH candidate according to the monitored DCI formats. For each DL BWP configured to a UE in a serving cell, a UE can be provided by higher layer signaling with p≤3 CORESETs. For each CORESET, the UE is provided the following by ControlResourceSet: a CORESET index p, 0≤p<12, by controlResourceSetId; a DM-RS scrambling sequence initialization value by pdcch-DMRS-ScramblingID; a precoder granularity for a number of REGs in the frequency domain where the UE can assume use of a same DM-RS precoder by precoderGranularity; a number of consecutive symbols provided by duration; a set of resource blocks provided by frequencyDomain-Resources; CCE-to-REG mapping parameters provided by cce-REG-Mapping-Type; an antenna port quasi co-location, from a set of antenna port quasi co-locations provided by TCI-State, indicating quasi co-location information of the DM-RS antenna port for PDCCH reception in a respective CORESET; an indication for a presence or absence of a transmission configuration indication (TCI) field for DCI format 1_1 (DCI format 1_2, or DCI format 1_3) transmitted by a PDCCH in CORESET p, by TCI-PresentInDCI. An example of the IE ControlResourceSet used to configure a time/frequency control resource set (CORESET) in which to search for downlink control information is shown in Listing 16.

| Listing 16 |
|---|
| ```
-- ASN1START
-- TAG-CONTROLRESOURCESET-START
ControlResourceSet ::=          SEQUENCE {
    controlResourceSetId            ControlResourceSetId,
    frequencyDomainResources        BIT STRING (SIZE (45) ),
    duration                                            INTEGER
(1..maxCoReSetDuration),
    cce-REG-MappingType             CHOICE {
        interleaved                     SEQUENCE {
            reg-BundleSize                  ENUMERATED {n2, n3,
n6},
``` |

-continued

Listing 16

```
      interleaverSize                    ENUMERATED {n2, n3,
n6},
      shiftIndex
INTEGER(0..maxNrofPhysicalResourceBlocks–1)     OPTIONAL -- Need
S
    },
    nonInterleaved                      NULL
  },
  precoderGranularity                   ENUMERATED
{sameAsREG-bundle, allContiguousRBs},
  tci-StatesPDCCH-ToAddList             SEQUENCE(SIZE
(1..maxNrofTCI-StatesPDCCH) ) OF TCI-StateId OPTIONAL, -- Cond
NotSIB1-initialBWP
  tci-StatesPDCCH-ToReleaseList         SEQUENCE(SIZE
(1..maxNrofTCI-StatesPDCCH) ) OF TCI-StateId OPTIONAL, -- Cond
NotSIB1-initialBWP
  tci-PresentInDCI          ENUMERATED {enabled}
OPTIONAL, -- Need S
  pdcch-DMRS-ScramblingID   INTEGER (0..65535)
OPTIONAL, -- Need S
  ...
}
-- TAG-CONTROLRESOURCESET-STOP
-- ASN1STOP
```

If DCI format 0_3 and/or DCI format 1_3 is introduced, a UE 102 may monitor PDCCH candidates in a new common search space which may be named as Type4-PDCCH common search space set configured by higher layer parameter SearchSpaceNRlightin PDCCH-Config with searchSpaceType=common for DCI formats with CRC scrambled by C-RNTI, MCS-C-RNTI, new RNTI (e.g., L-RNTI, L-UL-RNTI, L-DL-RNTI) or CS-RNTI(s). The higher layer parameter SearchSpaceNRlight may provide monitoring periodicity and an offset, a number of consecutive slots that a search space lasts in every occasion, symbols for PDCCH monitoring in the slots configured for PDCCH monitoring, a number of PDCCH candidates per aggregation level, an identity of the search space, a search space type indicating whether this is a common search space (present) and/or a UE-specific search space as well as DCI formats to monitor.

If DCI format 0_3 and/or DCI format 1_3, a UE 102 may reuse an existing Type3-PDCCH common search space set configured by higher layer parameter SearchSpace in PDCCH-Config with searchSpaceType=common with a newly introduced DCI format (e.g., dci-Format0-3 and/or dci-Format1-3 in Listing 12) and/or other parameters described above. If dci-Format0-3 is configured, the UE 102 may monitor the DCI format 0_3 with CRC scrambled by C-RNTI, MCS-C-RNTI, new RNTI (e.g., L-RNTI, L-UL-RNTI) or CS-RNTI(s). If dci-Format1-3 is configured, the UE 102 may monitor the DCI format 1_3 with CRC scrambled by C-RNTI, MCS-C-RNTI, new RNTI (e.g., L-RNTI, L-DL-RNTI) or CS-RNTI(s).

If DCI format 0_3 and/or DCI format 1_3 is introduced, a UE 102 may reuse the UE-specific search space set configured by SearchSpace in PDCCH-Config with searchSpaceType=ue-Specific with a newly introduced DCI format (e.g., formats0-3-And-1-3 in Listing 12) and/or other parameters mentioned above. If the parameter dci-Formats in ue-Specific indicates formats0-3-And-1-3, it configures this search space as UE-specific search space (USS). The UE 102 may monitor the DCI format (DCI format 0_3 and/or DCI format 1_3) with CRC scrambled by C-RNTI, MCS-C-RNTI, new RNTI (e.g., L-RNTI, L-UL-RNTI, L-DL-RNTI) or CS-RNTI(s).

A UE 102 may monitor PDCCH conveying DCI format 0_3 and/or DCI format 1_3 in the common search space set and/or the UE-specific search space. For example, the UE 102 may monitor PDCCH candidates in one or more of the following search spaces sets: a Type1-PDCCH common search space set configured by ra-SearchSpace (e.g., a higher layer parameter) for a DCI format(s) with CRC scrambled by a RA-RNTI, and/or a TC-RNTI; a Type3-PDCCH common search space set configured by SearchSpace (e.g., a higher layer parameter) with searchSpaceType=common for a DCI format(s) with CRC scrambled by INT-RNTI, INT-UL-RNTI, C-RNTI, new RNTI (e.g., L-RNTI, L-UL-RNTI, L-DL-RNTI) and/or CS-RNTI(s); and a UE-specific search space set configured by SearchSpace (e.g., the higher layer parameter) with searchSpaceType=ue-Specific for a DCI format(s) with CRC scrambled by C-RNTI, new RNTI (e.g., L-RNTI, L-UL-RNTI, L-DL-RNTI) or CS-RNTI(s).

Also, for example, for each DL BWP configured to a UE in a serving cell, the UE is provided by a higher layer parameter with S≤10 search space sets where, for each search space set from the S search space sets, the UE 102 may be provided one or more of the following by a higher layer parameter SearchSpace: a search space set index s, 0≤s<40, by a higher layer parameter searchSpaceId; an association between the search space set s and a control resource set p by a higher layer parameter controlResourceSetId; a PDCCH monitoring periodicity of $k_{p,s}$ slots and a PDCCH monitoring offset of $o_{p,s}$ slots, by a higher layer parameter monitoringSlotPeriodicityAndOffset; a PDCCH monitoring pattern within a slot, indicating first symbol(s) of the control resource set within a slot for PDCCH monitoring, by a higher layer parameter monitoringSymbolsWithinSlot; a number of PDCCH candidates $M_{p,s}^{(L)}$ per CCE aggregation level L by a higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively; an indication that search space set s is either a common search space set or a UE-specific search space set by a higher layer parameter searchSpaceType.

If the search space set s is a common search space set, then the UE 102 is provided the following by a higher layer parameter SearchSpace: an indication by higher layer parameter dci-Format0-0-AndFormat1-0 to monitor PDCCH candidates for DCI format 0_0 and DCI format 1_0 with CRC scrambled by a C-RNTI, a CS-RNTI, RA-RNTI, new RNTI (e.g., L-RNTI, L-UL-RNTI, L-DL-RNTI) and/or TC-RNTI; an indication by higher layer parameter dci-Format0-3 to monitor PDCCH candidates for DCI format 0_3; an indication by higher layer parameter dci-Format1-3 to monitor PDCCH candidates for DCI format 1_3.

If the search space set s is a UE-specific search space set, then the UE 102 is provided the following by a higher layer parameter SearchSpace: an indication by a higher layer parameter dci-Formats to monitor PDCCH candidate either for DCI format 0_0 and DCI format 1_0, or for DCI format 0_1 and DCI format 1_1, or for DCI format 0_2 and DCI format 1_2, or for DCI format 0_3 and DCI format 1_3.

Here, the UE 102 may determine a PDCCH monitoring occasion(s) from the PDCCH monitoring periodicity, the PDCCH monitoring offset, and/or the PDCCH monitoring pattern within a slot. As described above, for example, for each search space set, DCI format 0_3 with CRC scrambled by new RNTI (e.g., L-RNTI, L-UL-RNTI) and/or DCI format 1_3 with CRC scrambled by new RNTI (e.g., L-RNTI, L-DL-RNTI) may be independently configured. For example, the PDCCH monitoring occasion(s) may be independently configured for DCI format 0_3 with CRC scrambled by new RNTI (e.g., L-RNTI, L-UL-RNTI) and/or DCI format 1_3 with CRC scrambled by new RNTI (e.g., L-RNTI, L-DL-RNTI).

Here, for each search space set, DCI format 0_3 with CRC scrambled by new RNTI (e.g., L-RNTI, L-UL-RNTI) and/or DCI format 1_3 with CRC scrambled by new RNTI (e.g., L-RNTI, L-DL-RNTI) may be commonly configured. For example, the PDCCH monitoring occasion(s) may be commonly configured for DCI format 0_3 with CRC scrambled by new RNTI (e.g., L-RNTI, L-UL-RNTI) and/or DCI format 1_3 with CRC scrambled by new RNTI (e.g., L-RNTI, L-DL-RNTI). For example, the gNB 160 may configure for the UE 102 to monitor the PDCCH candidates for the DCI format 0_3, and, the UE 102 may monitor, based on the parameter(s) as described above, both of the DCI format 0_3 with CRC scrambled by new RNTI (e.g., L-RNTI, L-UL-RNTI) and/or DCI format 1_3 with CRC scrambled by new RNTI (e.g., L-RNTI, L-DL-RNTI).

To support reduced capability UE(s) and its service(s), reduced PDCCH monitoring by smaller numbers of blind decodes and CCE limits may be needed (for the search space of new DCI format (e.g., DCI format 0_3 and/or DCI format 1_3) if the new DCI format is configured for UE with reduced capability and/or the search space of existing DCI format (e.g., DCI format 0_0, DCI format 0_1, DCI format 0_2, DCI format 1_0, DCI format 1_1, and/or DCI format 1_2) if the existing DCI format is configured for UE with reduced capability). Monitoring periodicity may be separately configured for NR light and the value(s) may be larger than 1 slot. Monitoring occasion(s) within a slot (e.g., monitoringSymbolsWithinSlot) may be configured separately configured for NR light and the number of monitoring occasion(s) within a slot may not be larger than 1 (e.g., only 1 monitoring symbol is indicated by higher layer parameter monitoringSymbolsWithinSlot). Number of PDCCH candidates (per CCE aggregation level) may be configured separately configured for NR light and the number of PDCCH candidates may be limited (e.g., only 1 is supported).

The behavior/procedure/configuration described in the disclosure for reduced capability UE may be treated as a UE feature. The UE feature may be configured to a UE by RRC message (e.g., UE Capability Information). If the UE is configured with the reduced capability UE feature by the RRC message, the UE may use NR light specific configuration(s), NR light specific DCI format(s), NR light specific parameter(s)/table(s) and/or NR light specific procedure(s) as mentioned above.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for resource allocation of enhanced uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
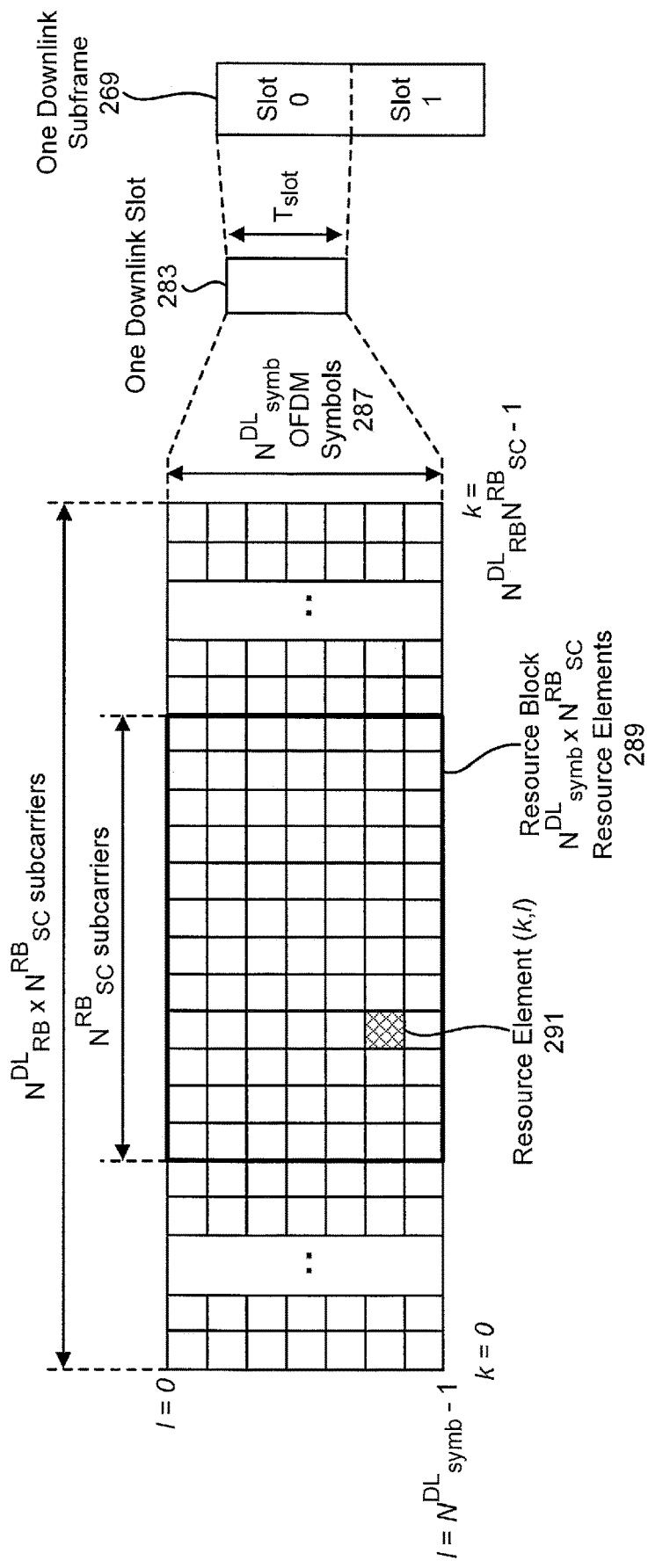
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For a SCell (including a Licensed Assisted Access (LAA) SCell), $N^{DL}_{RB}$ is configured by a RRC message dedicated to a UE 102. For PDSCH mapping, the available RE 291 may be the RE 291 whose index l fulfills $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
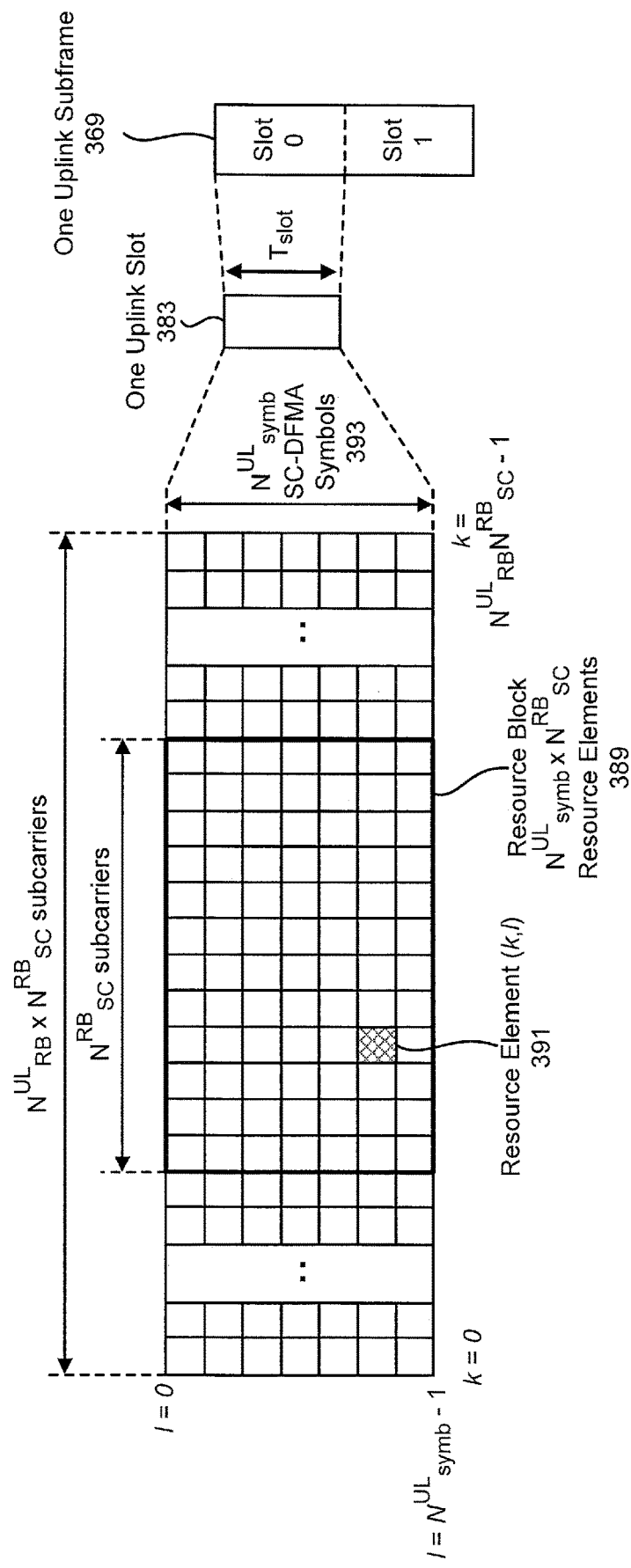
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For a SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM and/or DFT-S-OFDM symbols in time domain. A region defined by one sub-carrier in the frequency domain and one OFDM and/or DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
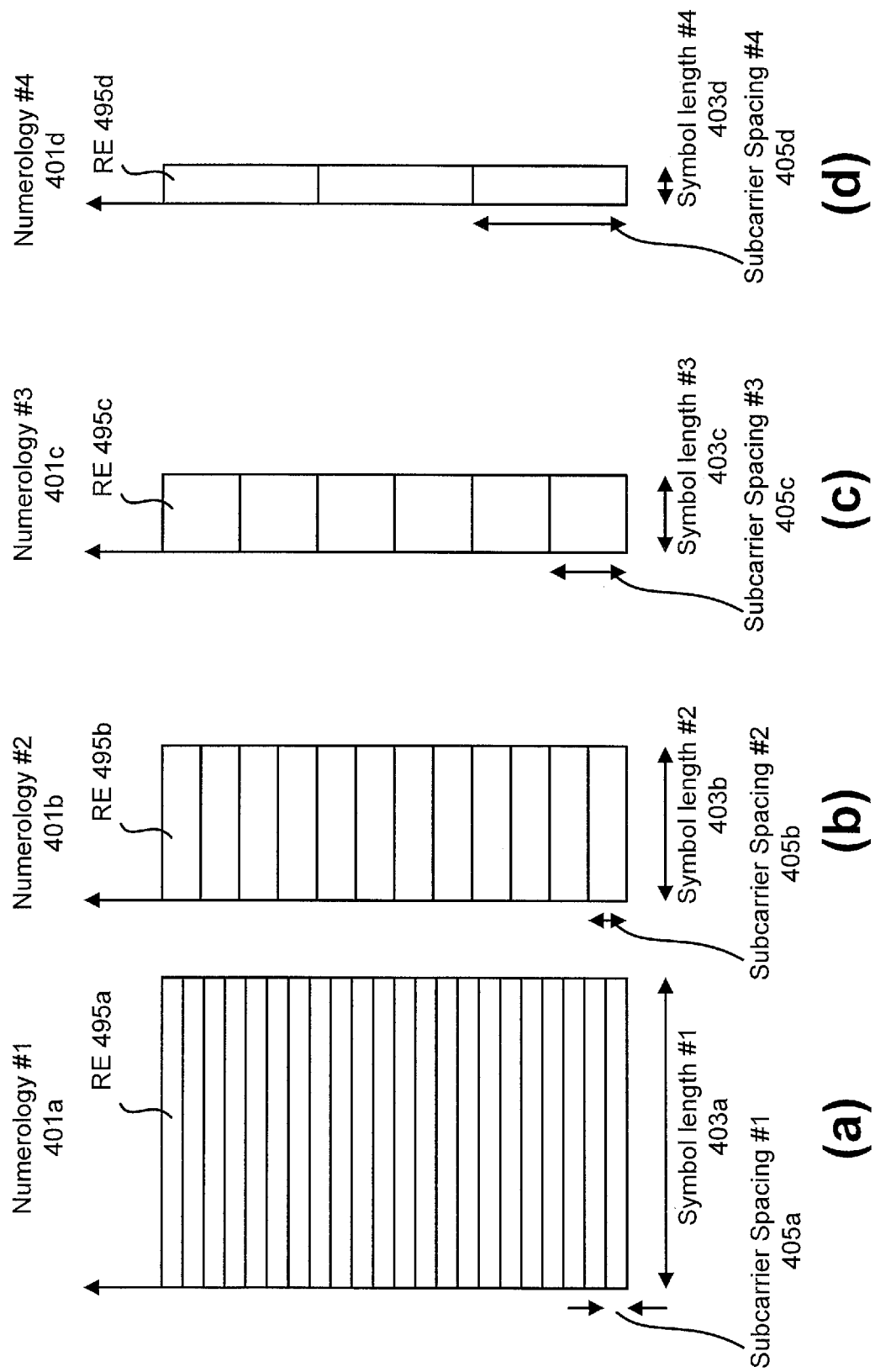
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048Ts+CP length (e.g., 160Ts or 144Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). In some examples, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. In some examples, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. In some examples, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. For instance, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
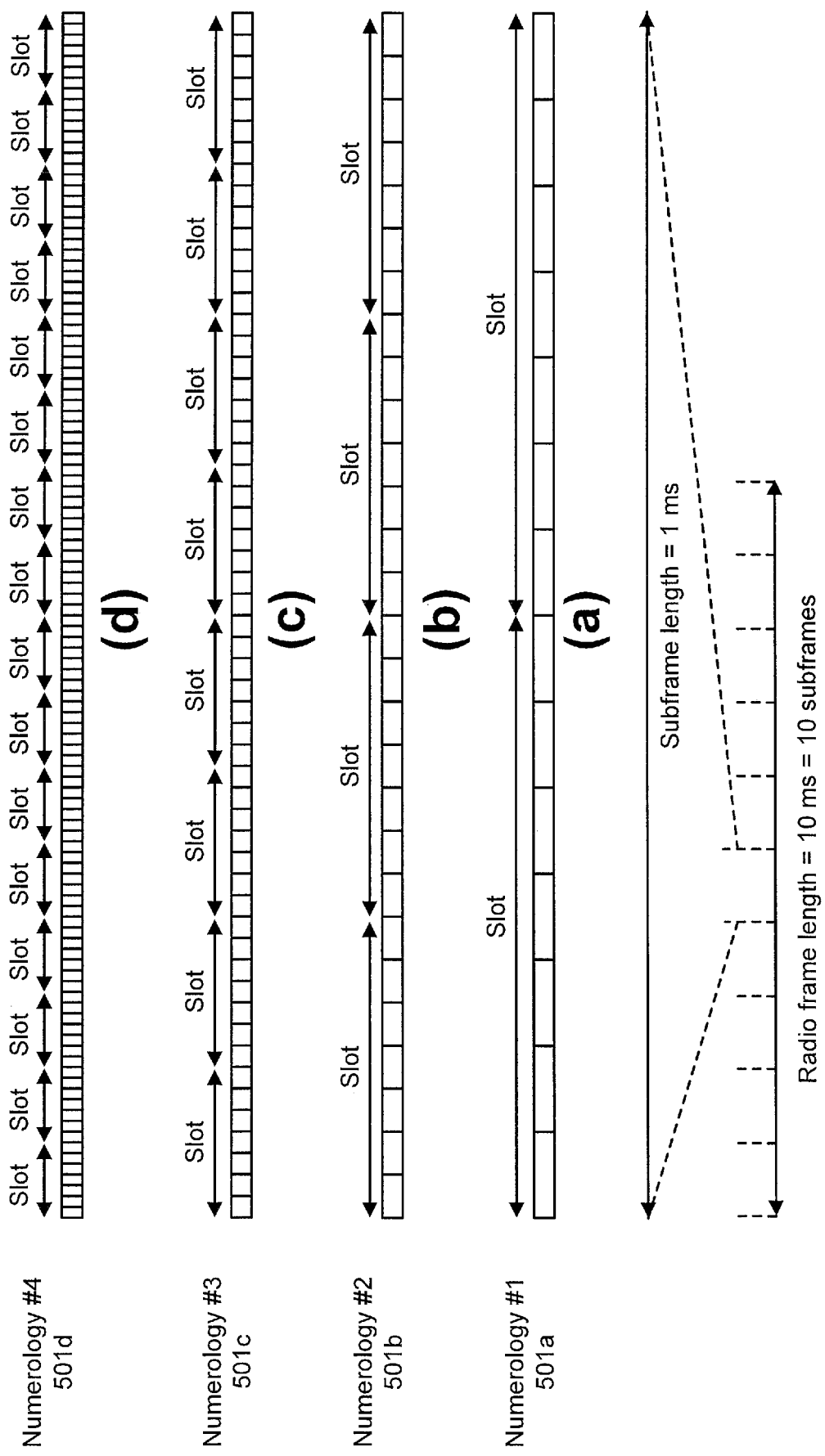
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
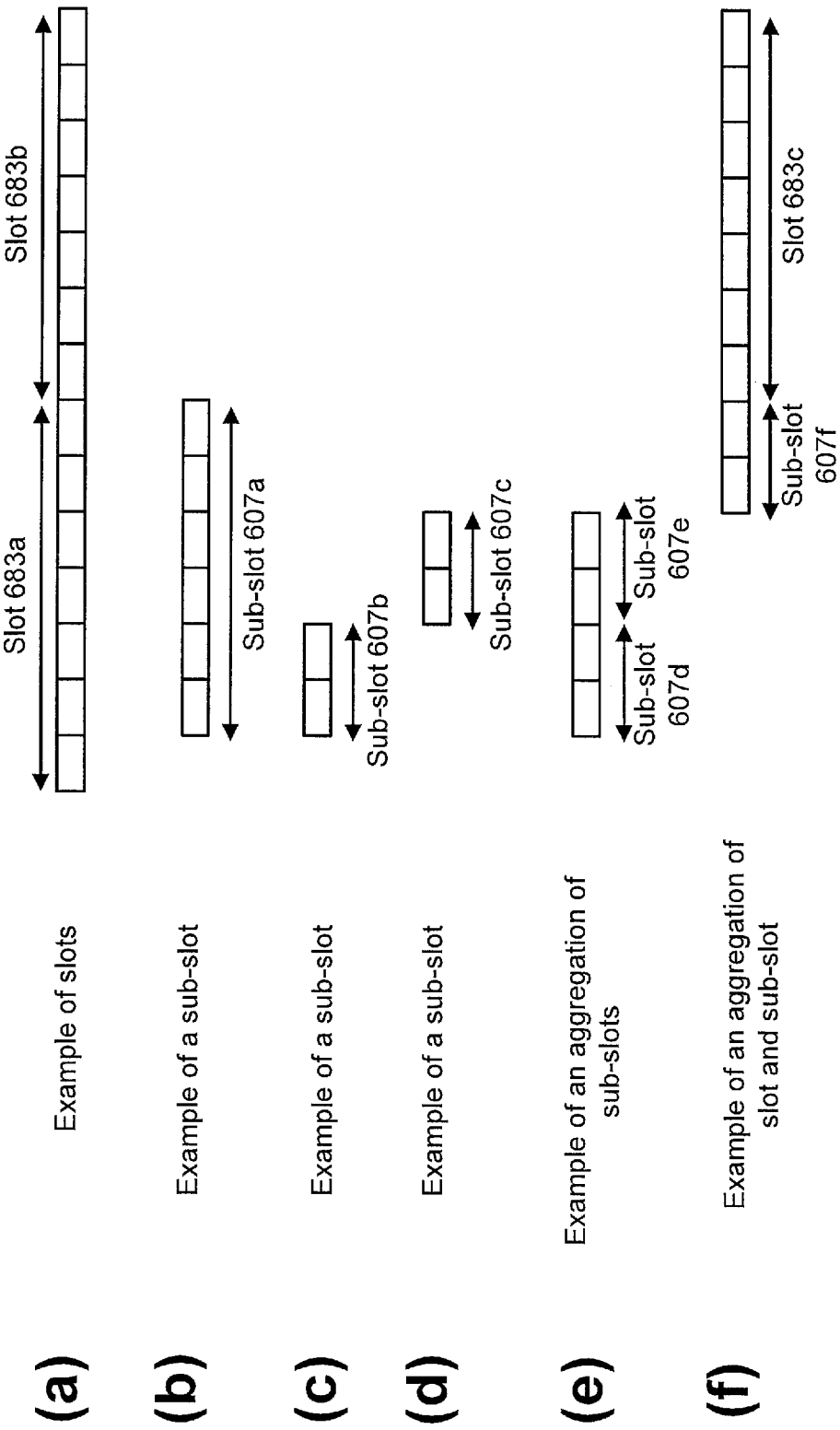
FIG. 6 shows examples of slots and sub-slots.

FIG. 6 shows examples of slots 683 and sub-slots 607. If a sub-slot 607 is not configured by higher layer, the UE 102 and the eNB and/or gNB 160 may only use a slot 683 as a scheduling unit. More specifically, a given transport block may be allocated to a slot 683. If the sub-slot 607 is configured by higher layer, the UE 102 and the eNB and/or gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
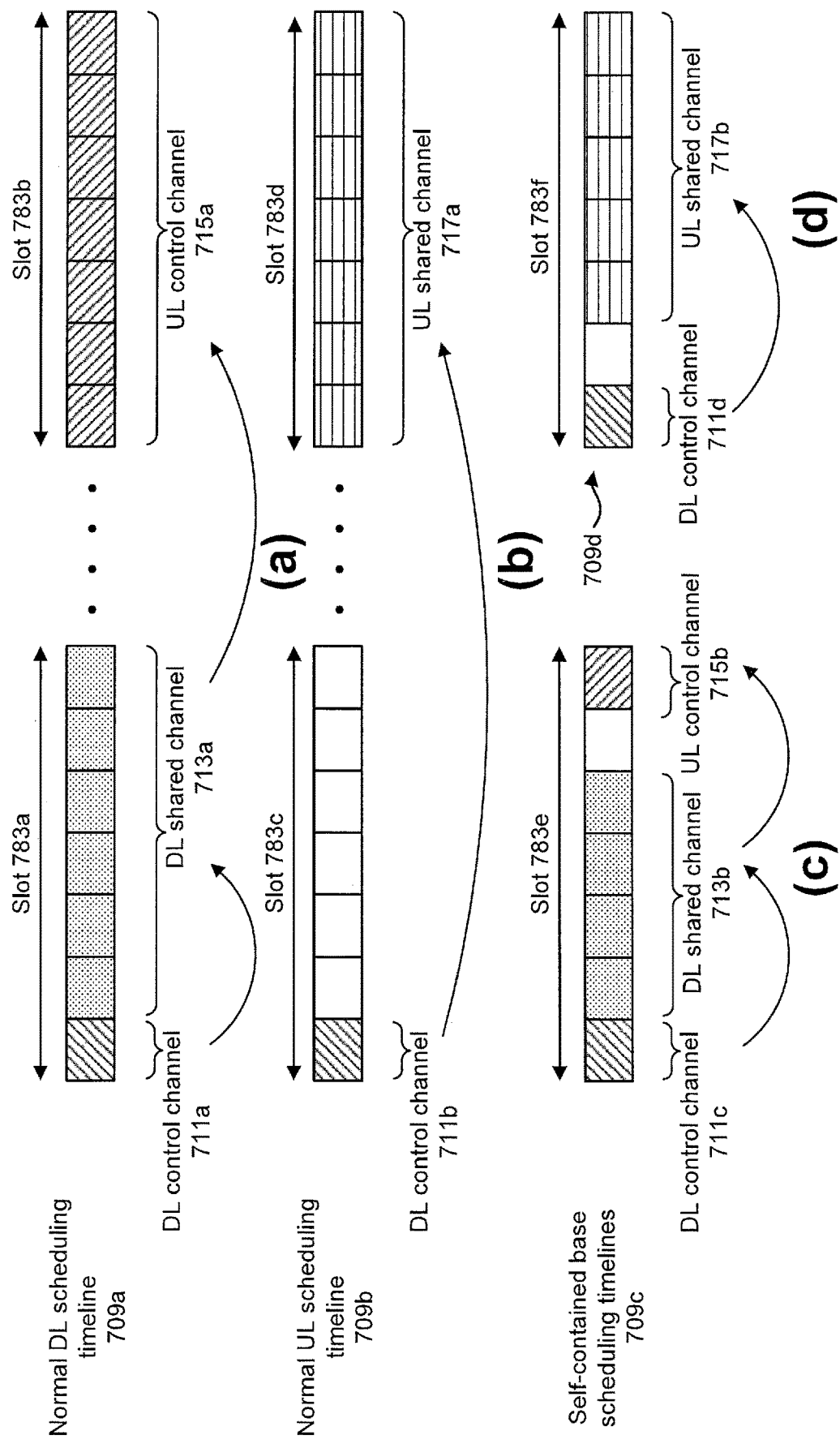
FIG. 7 shows examples of scheduling timelines.

FIG. 7 shows examples of scheduling timelines 709. For a normal DL scheduling timeline 709*a*, DL control channels are mapped the initial part of a slot 783*a*. The DL control channels 711 schedule DL shared channels 713*a* in the same slot 783*a*. HARQ-ACKs for the DL shared channels 713*a* (i.e., HARQ-ACKs each of which indicates whether or not transport block in each DL shared channel 713*a* is detected successfully) are reported via UL control channels 715*a* in a later slot 783*b*. In this instance, a given slot 783 may contain either one of DL transmission and UL transmission.

For a normal UL scheduling timeline 709*b*, DL control channels 711*b* are mapped the initial part of a slot 783*c*. The DL control channels 711*b* schedule UL shared channels 717*a* in a later slot 783*d*. For these cases, the association timing (time shift) between the DL slot 783*c* and the UL slot 783*d* may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709*c*, DL control channels 711*c* are mapped to the initial part of a slot 783*e*. The DL control channels 711*c* schedule DL shared channels 713*b* in the same slot 783*e*. HARQ-ACKs for the DL shared channels 713*b* are reported in UL control channels 715*b*, which are mapped at the ending part of the slot 783*e*.

For a self-contained base UL scheduling timeline 709*d*, DL control channels 711*d* are mapped to the initial part of a slot 783*f*. The DL control channels 711*d* schedule UL shared channels 717*b* in the same slot 783*f*. For these cases, the slot 783*f* may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
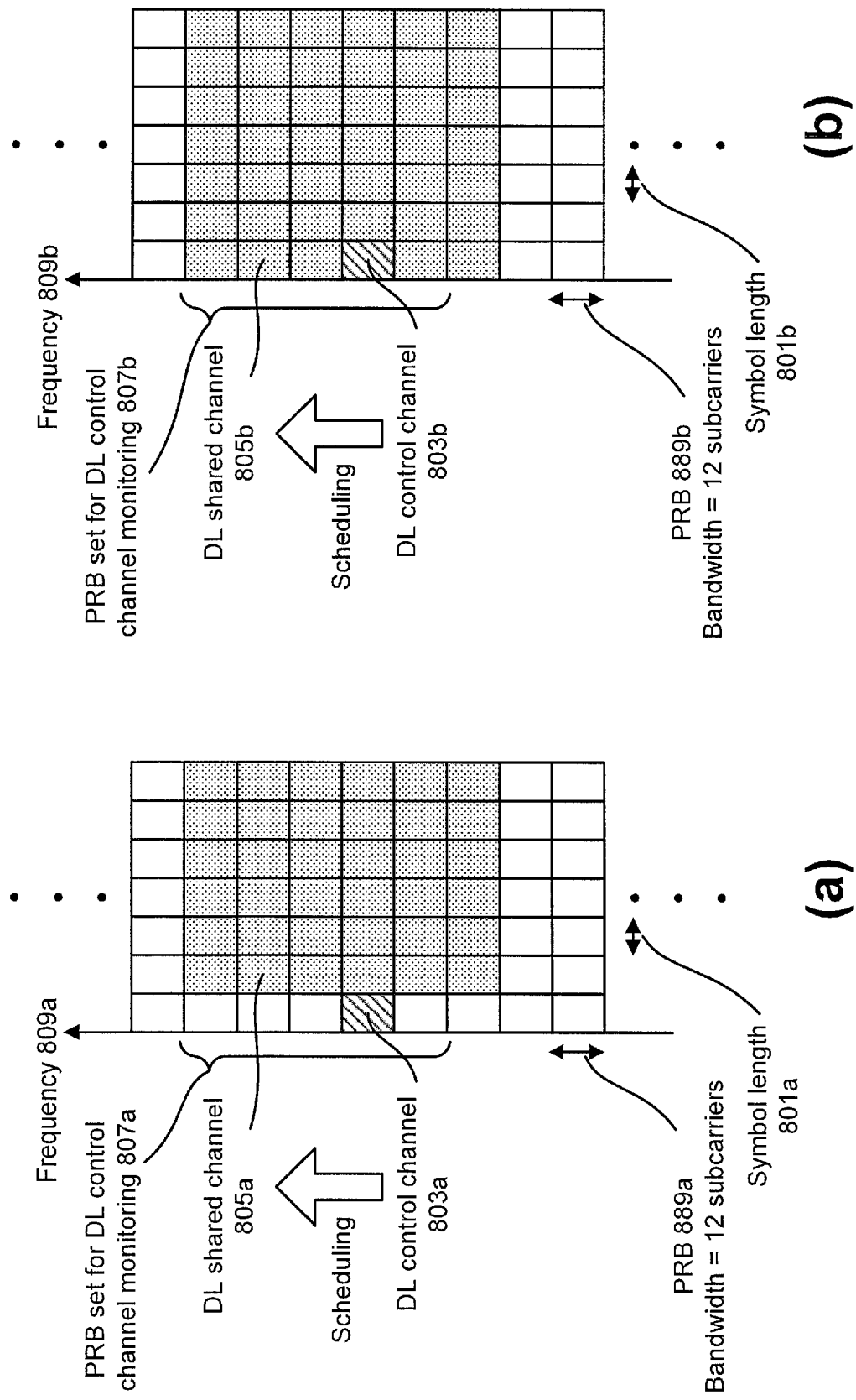
FIG. 8 shows examples of DL control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DMRS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
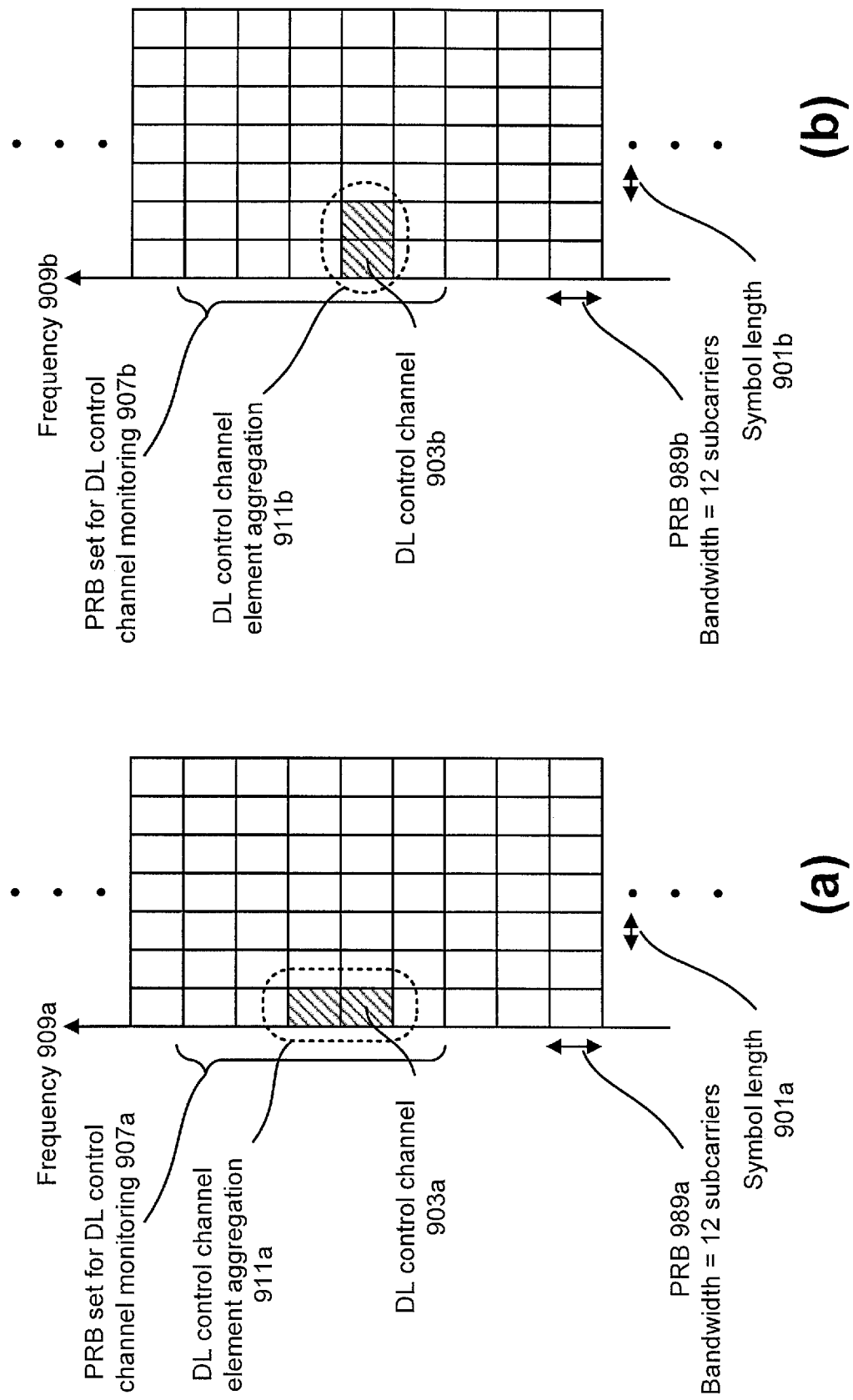
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, for instance multiple DL control channel elements within an OFDM symbol are aggregated. Otherwise, DL control channel elements in different OFDM symbols can be aggregated.

Figure 10:
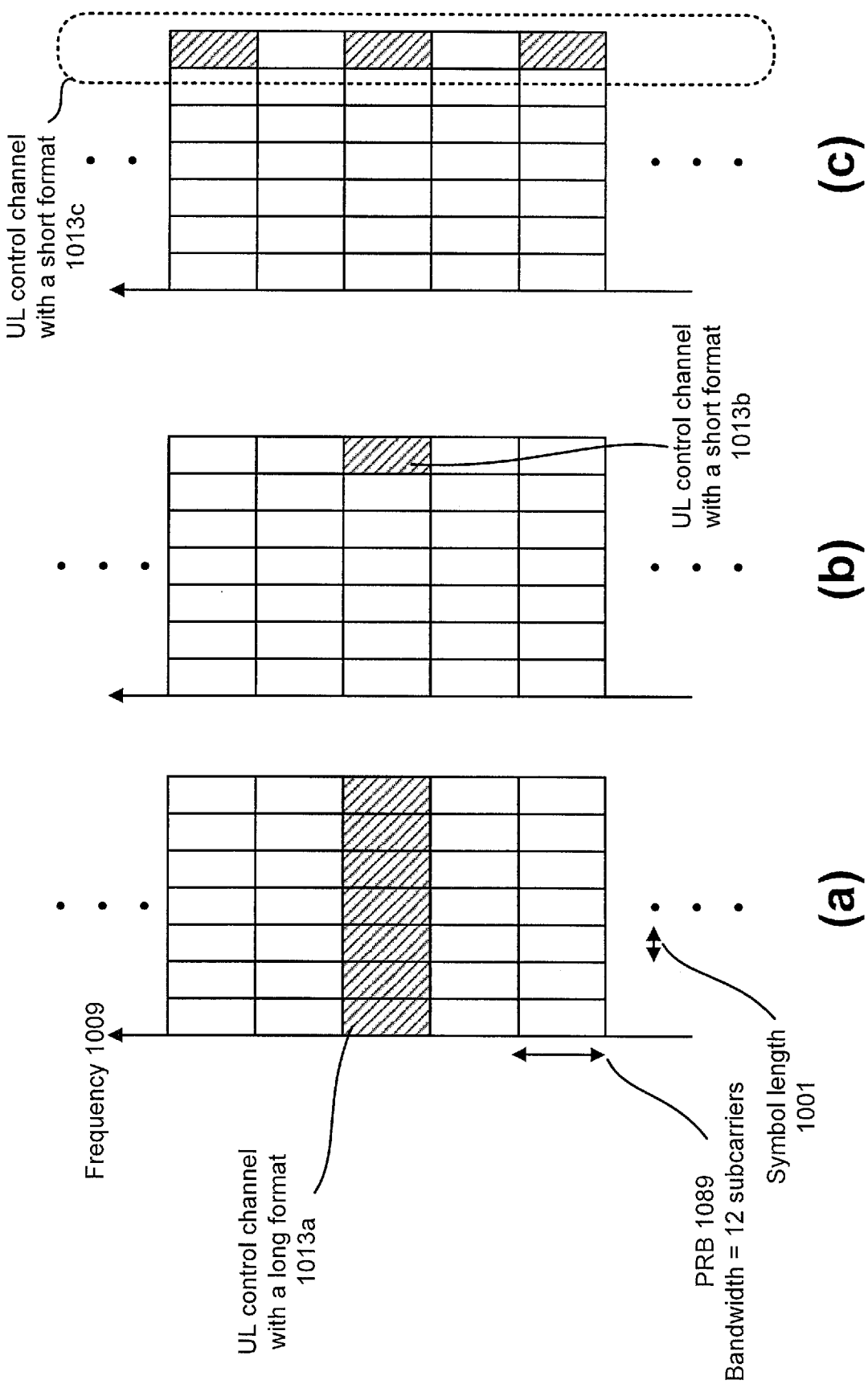
FIG. 10 shows examples of UL control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, for instance the UL control channel may be mapped to every N PRBs (e.g., 5 or 10) within a system bandwidth.

Figure 11:
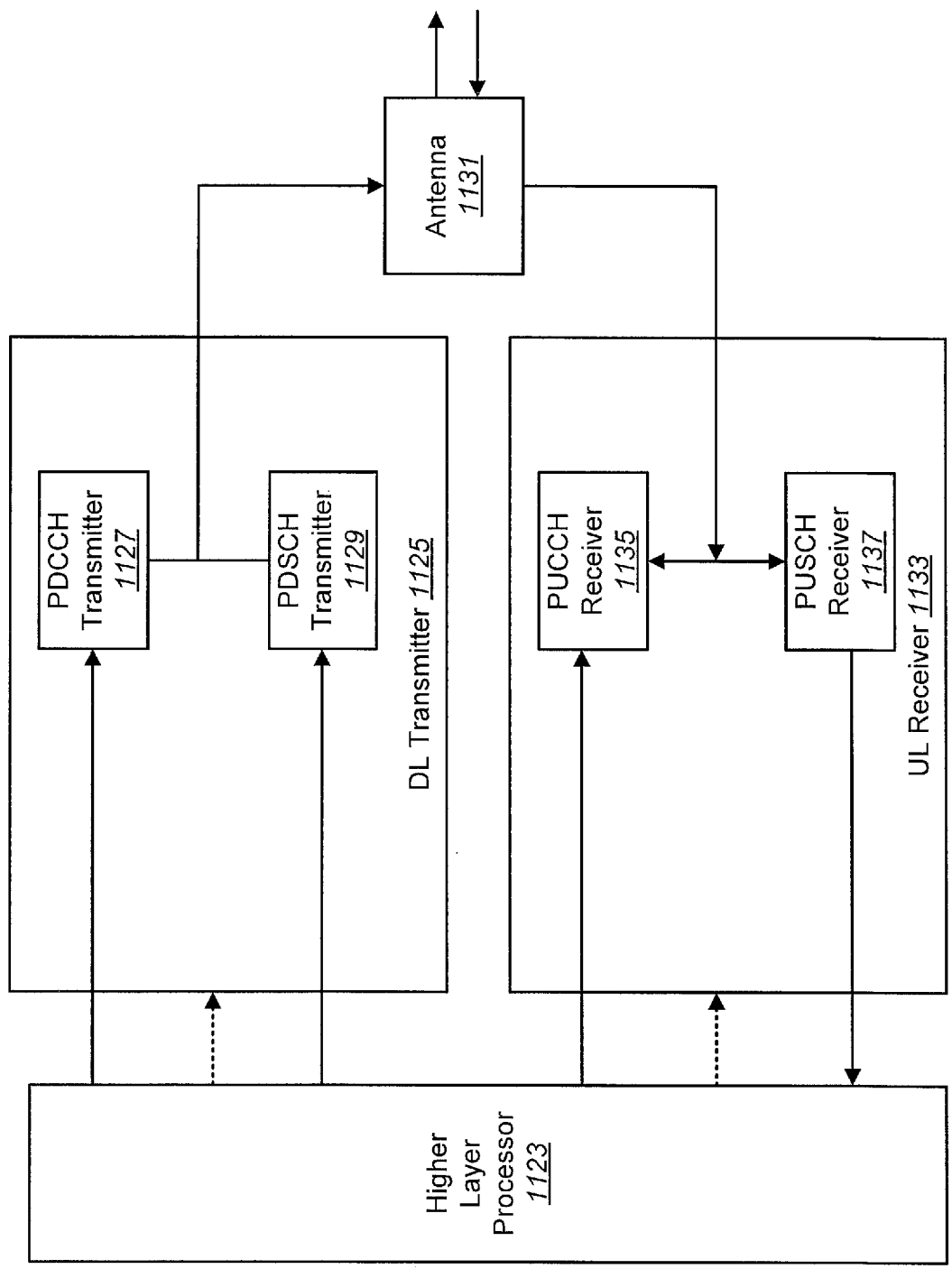
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
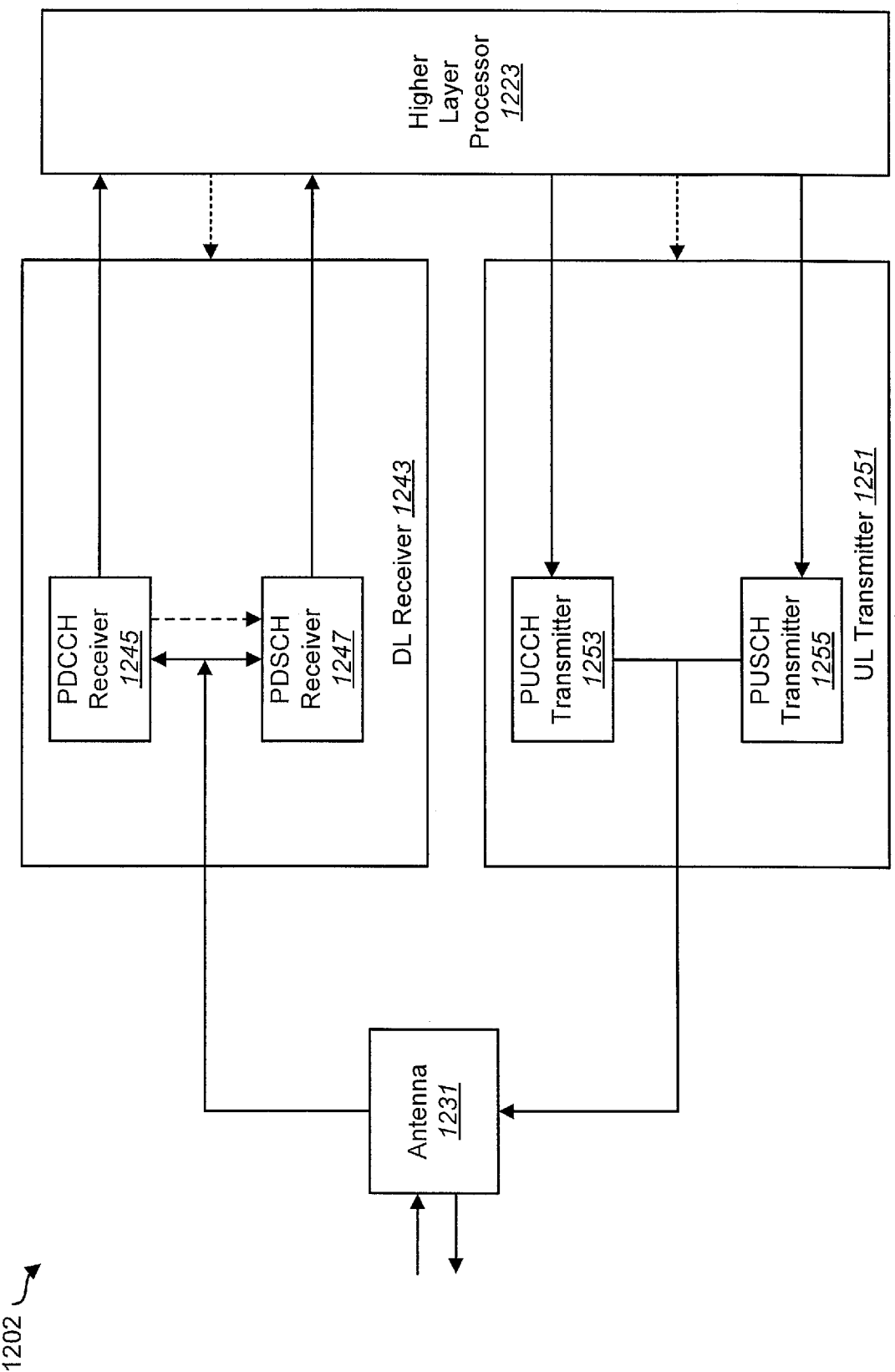
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
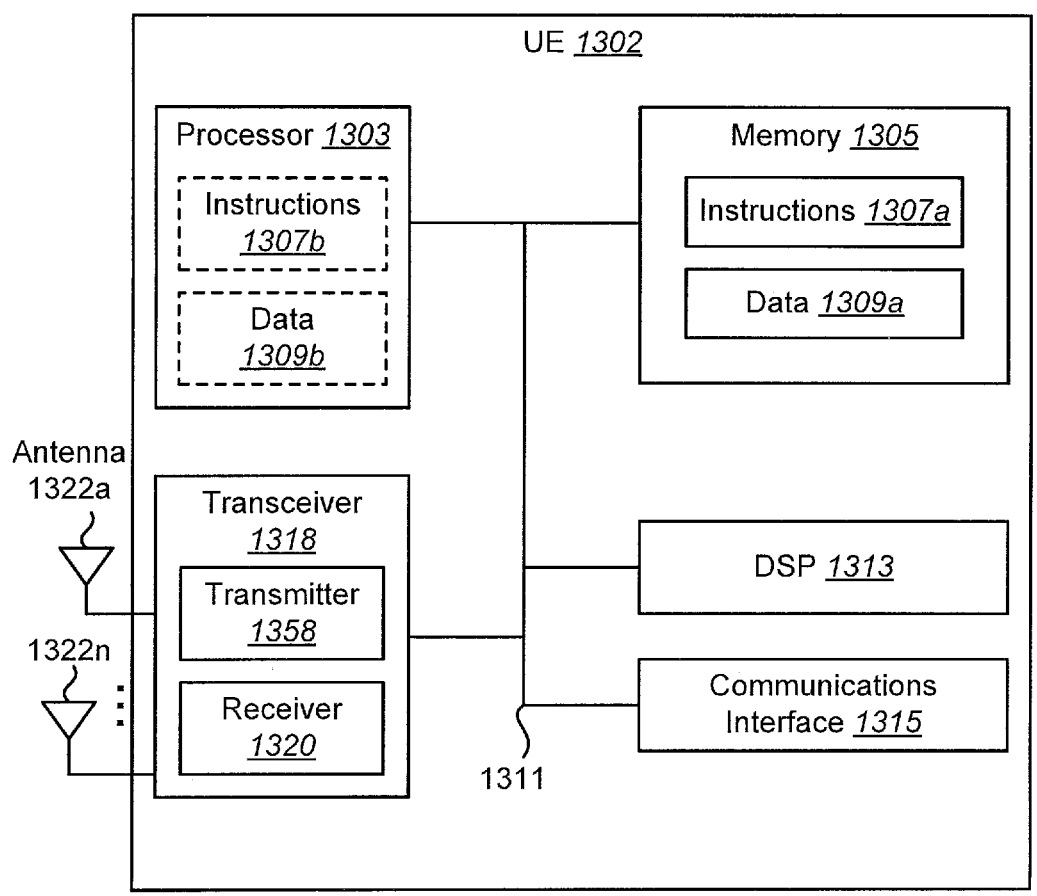
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307*a* and data 1309*a* to the processor 1303. A portion of the memory 1305 may also include non-volatile random-access memory (NVRAM). Instructions 1307*b* and data 1309*b* may also reside in the processor 1303. Instructions 1307*b* and/or data 1309*b* loaded into the processor 1303 may also include instructions 1307*a* and/or data 1309*a* from memory 1305 that were loaded for execution or processing by the processor 1303. The instructions 1307*b* may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
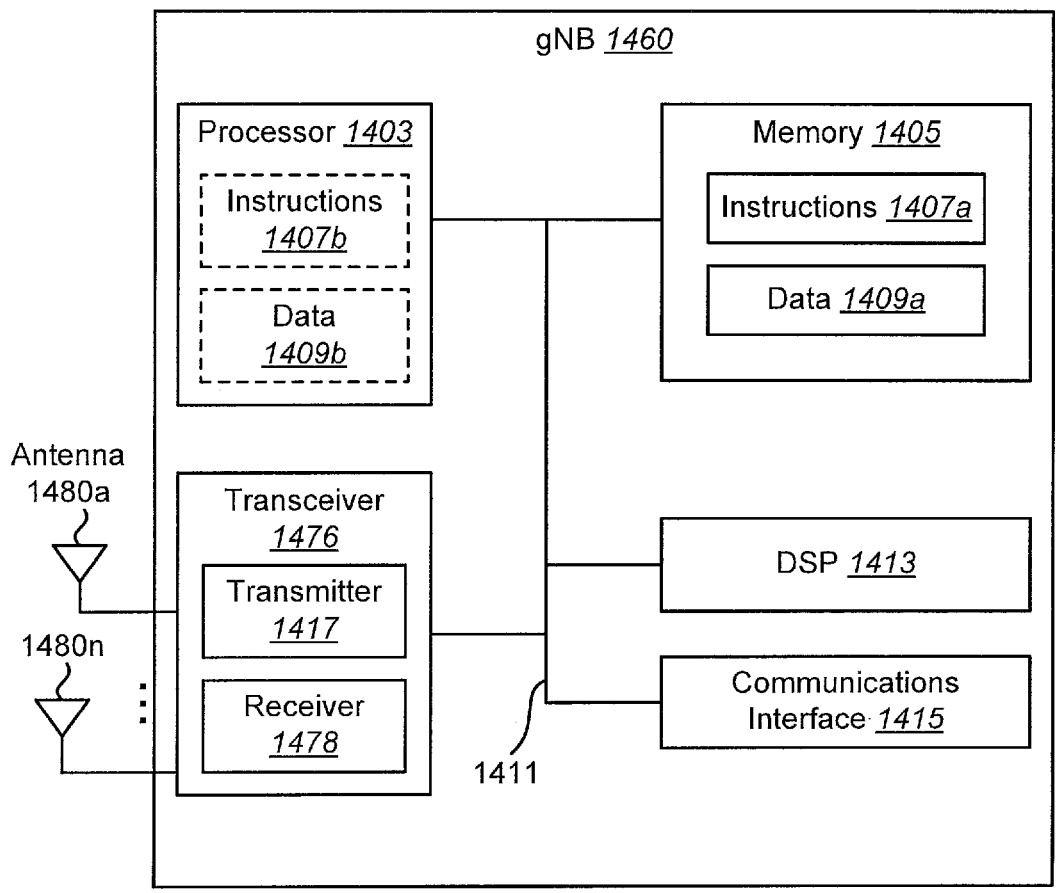
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random-access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
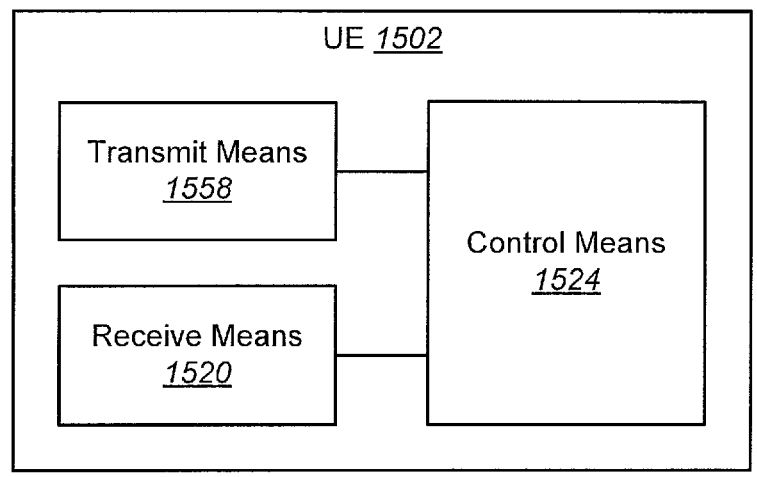
FIG. 15 is a block diagram illustrating one implementation of a UE in which systems and methods for resource allocations of enhanced uplink transmissions may be implemented.

FIG. 15 is a block diagram illustrating one implementation of a UE 1502 in which systems and methods for resource allocations of enhanced uplink transmissions may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
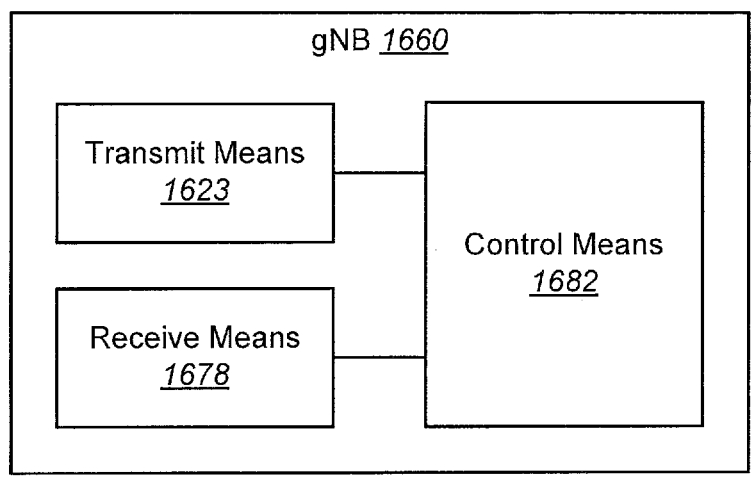
FIG. 16 is a block diagram illustrating one implementation of a gNB in which systems and methods for resource allocations of enhanced uplink transmissions may be implemented.

FIG. 16 is a block diagram illustrating one implementation of a gNB 1660 in which systems and methods for resource allocations of enhanced uplink transmissions may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
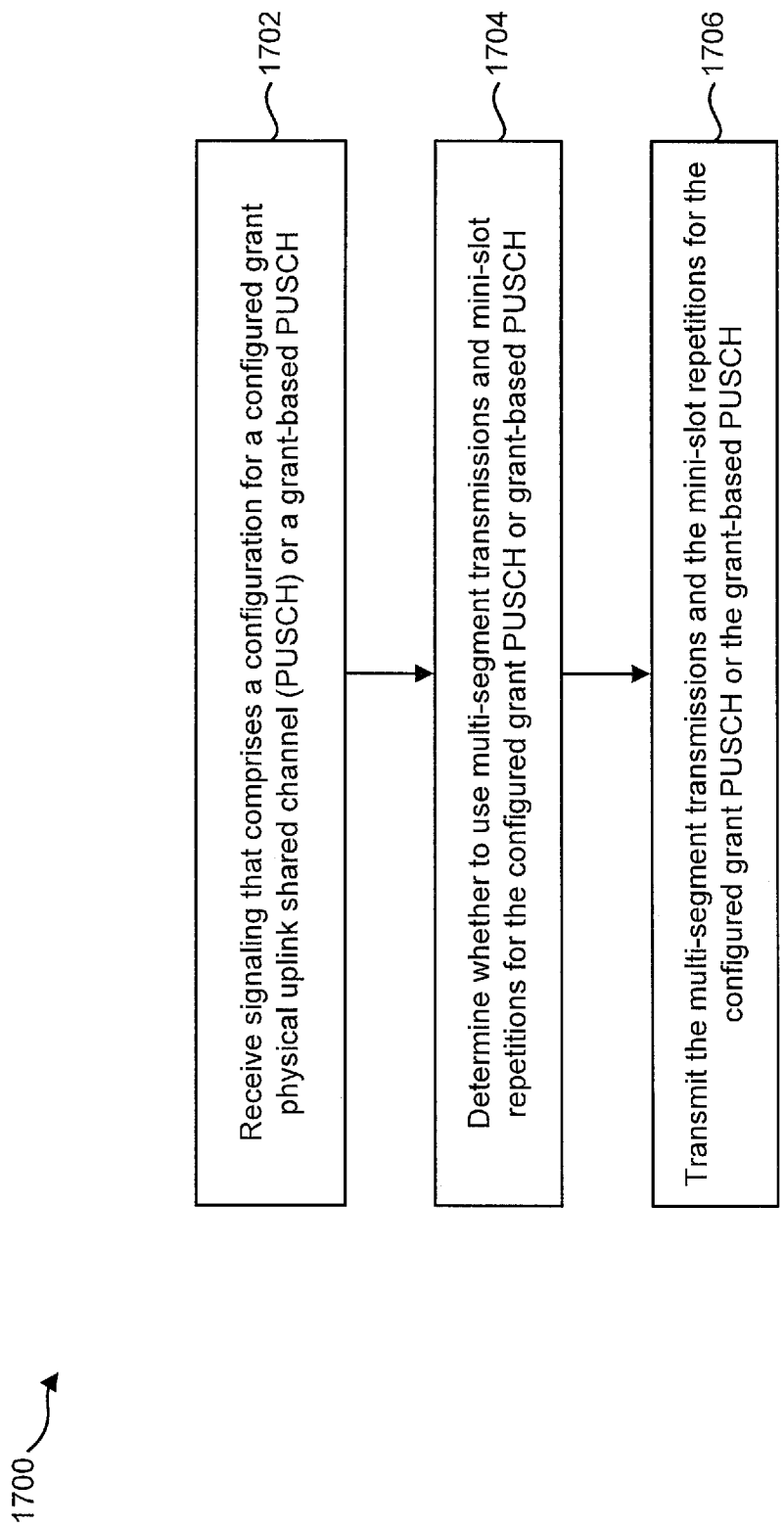
FIG. 17 is a flow diagram illustrating a method by a UE.

FIG. 17 is a flow diagram illustrating a method 1700 by a user equipment (UE) 102. The UE 102 may receive 1702 signaling that comprises a configuration for a configured grant physical uplink shared channel (PUSCH) or a grant-based PUSCH. The UE 102 may determine 1704 whether to use multi-segment transmissions and mini-slot repetitions for the configured grant PUSCH or grant-based PUSCH. The UE 102 may transmit 1706 the multi-segment transmissions and the mini-slot repetitions for the configured grant PUSCH or the grant-based PUSCH.

In one approach, one or more actual PUSCH repetitions in one slot, or two or more actual PUSCH repetitions across slot boundary in consecutive available slots, are supported using one uplink (UL) grant for the grant-based PUSCH and one configured grant configuration for the configured grant PUSCH.

In another approach, one or more PUSCH repetitions in one slot, or two or more PUSCH repetitions across slot boundary in consecutive available slots, are supported using one UL grant for the grant-based PUSCH and one configured grant configuration for the configured grant PUSCH.

Figure 18:
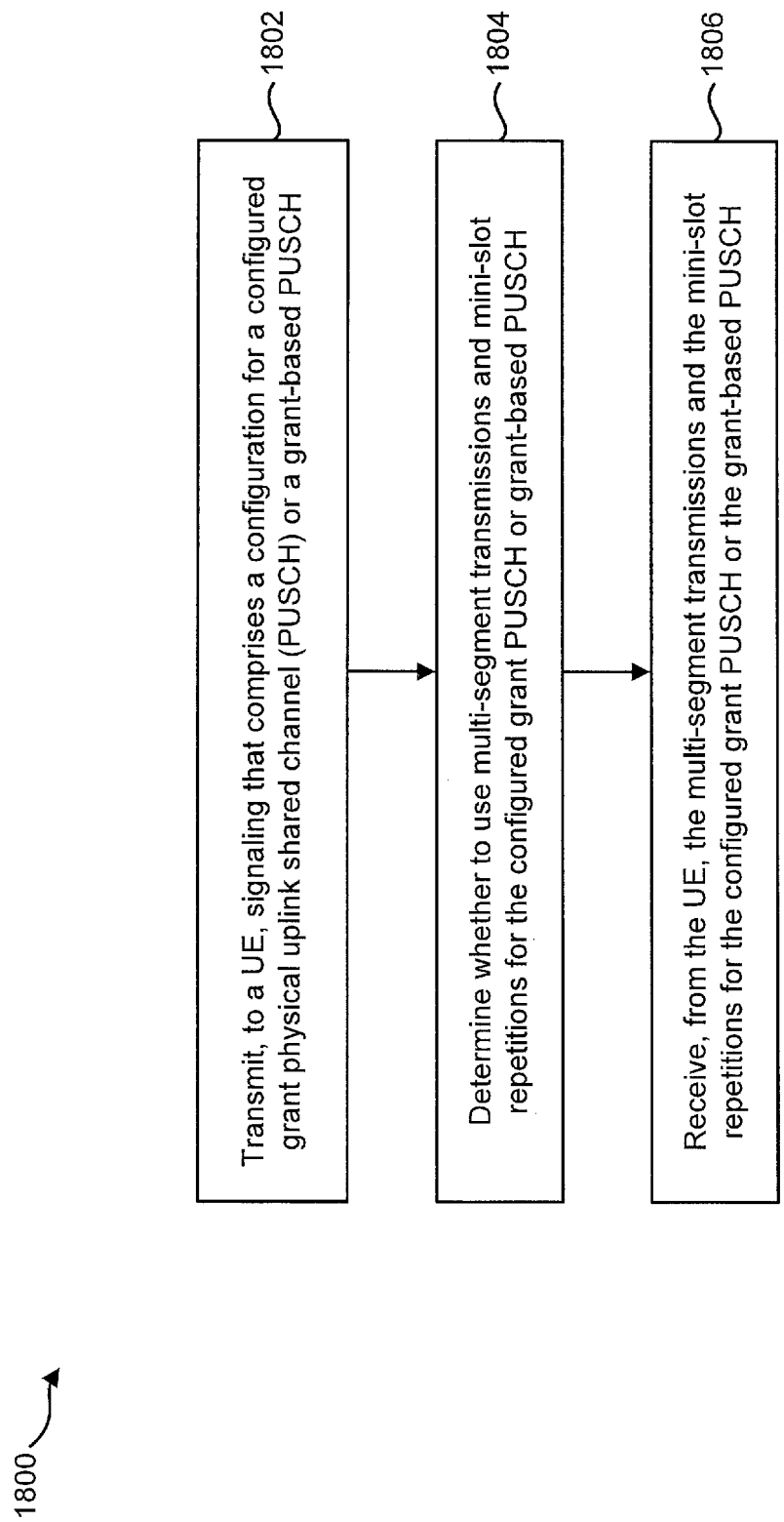
FIG. 18 is a flow diagram illustrating a method by gNB.

FIG. 18 is a flow diagram illustrating a method 1800 by a base station (gNB) 160. The gNB 160 may transmit 1802, to a user equipment (UE) 102, signaling that comprises a configuration for a configured grant physical uplink shared channel (PUSCH) or a grant-based PUSCH. The gNB 160 may determine 1804 determine whether to use multi-segment transmissions and mini-slot repetitions for the configured grant PUSCH or the grant-based PUSCH. The gNB 160 may receive 1806 the multi-segment transmissions and the mini-slot repetitions for the configured grant PUSCH or the grant-based PUSCH.

Figure 19:
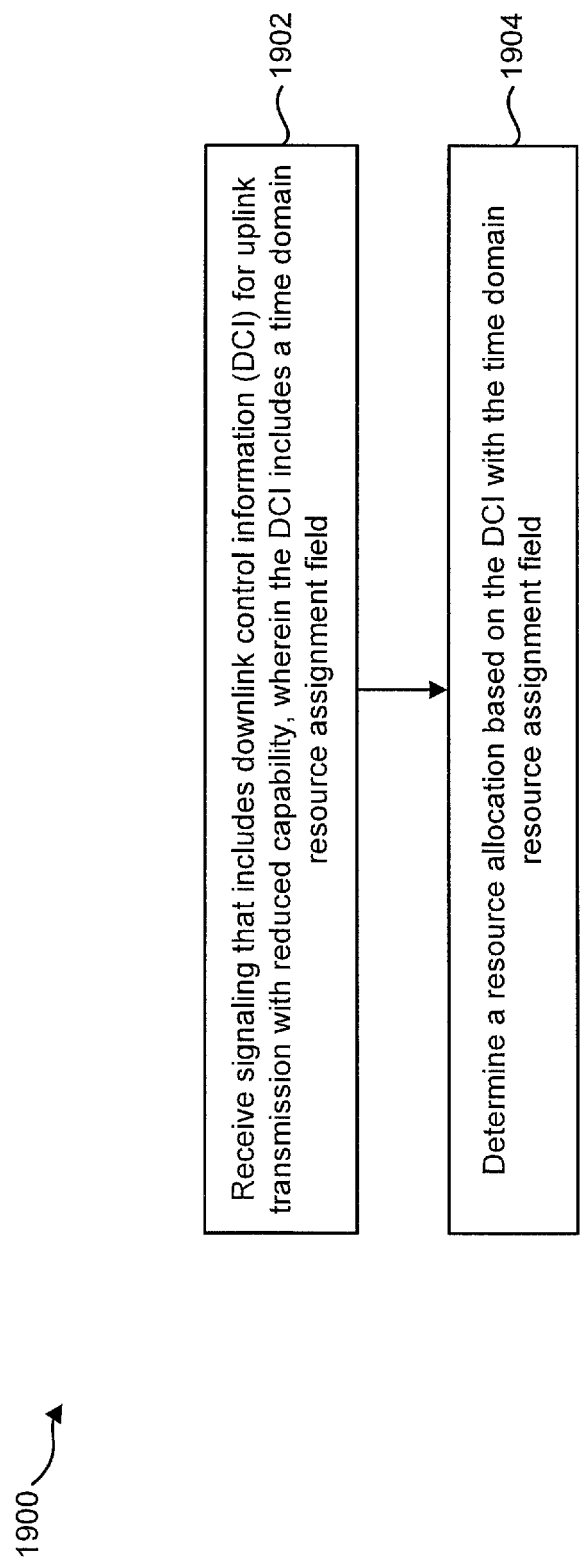
FIG. 19 is a flow diagram illustrating a method by a UE.

FIG. 19 is a flow diagram illustrating a method 1900 by a user equipment (UE) 102. The UE 102 may receive 1902 downlink control information (DCI) for uplink transmission with reduced capability. The DCI may include a time domain resource assignment field. The UE 102 may determine 1904 a resource allocation based on the DCI with the time domain resource assignment field.

Figure 20:
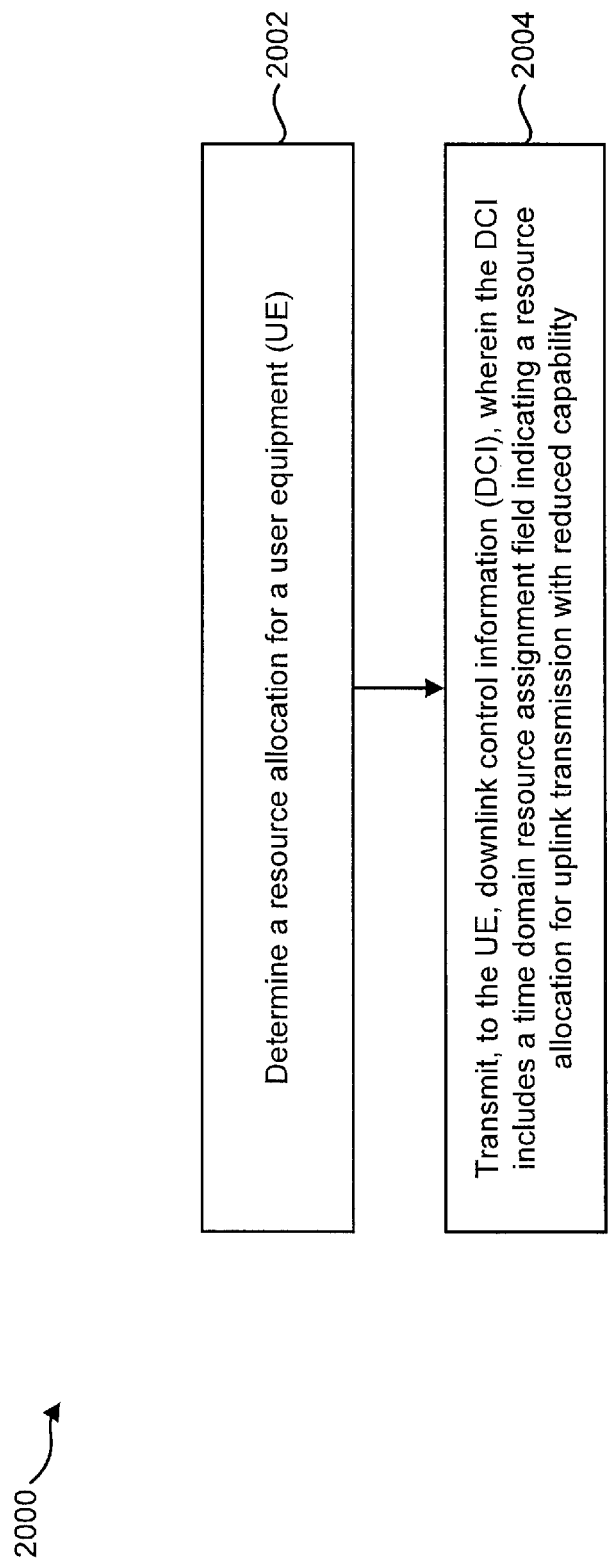
FIG. 20 is a flow diagram illustrating a method by gNB.

FIG. 20 is a flow diagram illustrating a method 2000 by a base station (gNB) 160. The gNB 160 may determine 2002 a resource allocation for a user equipment (UE) 102. The gNB 160 may transmit 2004, to the UE 102, downlink control information (DCI). The DCI may include a time domain resource assignment field indicating a resource allocation for uplink transmission with reduced capability.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

In one example, a user equipment (UE), comprising: receiving circuitry configured to receive downlink control information (DCI) for uplink transmission with reduced capability, wherein the DCI includes a time domain resource assignment field; and a processor configured to determine a resource allocation based on the DCI with the time domain resource assignment field.

In one example, a base station (gNB), comprising: a processor configured to determine a resource allocation for a user equipment (UE); and transmitting circuitry configured to transmit, to the UE, downlink control information (DCI), wherein the DCI includes a time domain resource assignment field indicating a resource allocation for uplink transmission with reduced capability.

In one example, a method by a user equipment (UE), comprising: receiving signaling that comprises downlink control information (DCI) for uplink transmission with reduced capability, wherein the DCI includes a time domain resource assignment field; and determining a resource allocation based on the DCI with the time domain resource allocation field.

In one example, a method by a base station (gNB), comprising: determining a resource allocation for a user equipment (UE); and transmitting, to the UE, downlink control information (DCI), wherein the DCI includes a time domain resource assignment field indicating a resource allocation for uplink transmission with reduced capability.

In one example, a user equipment (UE), comprising: receiving circuitry configured to receive a radio resource control (RRC) message comprising a time domain resource assignment table, the receiving circuitry configured to receive a RRC message comprising a modulation and coding scheme (MCS) table, the receiving circuitry configured to receive downlink control information (DCI) for an uplink transmission with reduced capability, wherein the DCI includes a time domain resource assignment field and a MCS field; and a processor configured to determine a resource allocation for the uplink transmission based on the DCI with the time domain resource assignment field and the time domain resource assignment table, the processor configured to determine a MCS for the uplink transmission based on the DCI with the MCS field and some of rows in the MCS table.

In one example, the UE, wherein the bitwidth of the MCS field is less than 5 bits.

In one example, the UE, wherein the DCI is with Cyclic Redundancy Check (CRC) scrambled by a new Radio Network Temporary Identifier (RNTI) which is introduced for the UE with reduced capability.

In one example, a base station (gNB), comprising: transmitting circuitry configured to transmit a radio resource control (RRC) message comprising a time domain resource assignment table, the transmitting circuitry configured to transmit a RRC message comprising a modulation and coding scheme (MCS) table, a processor configured to determine a resource allocation from the time domain resource assignment table and a MCS from some of rows in the MCS table for an uplink transmission of a user equipment (UE) with reduced capability; and transmitting circuitry configured to transmit, to the UE, downlink control information (DCI), wherein the DCI includes a time domain resource assignment field indicating the resource allocation for the uplink transmission and a MCS field indicating the MCS for the uplink transmission.

In one example, the gNB, wherein the bitwidth of the MCS field is less than 5 bits.

In one example, the gNB, wherein the DCI is with Cyclic Redundancy Check (CRC) scrambled by a new Radio Network Temporary Identifier (RNTI) which is introduced for the UE with reduced capability.

In one example, a method by a user equipment (UE), comprising: receiving a radio resource control (RRC) message comprising a time domain resource assignment table, receiving a RRC message comprising a modulation and coding scheme (MCS) table, receiving signaling that comprises downlink control information (DCI) for an uplink transmission with reduced capability, wherein the DCI includes a time domain resource assignment field and a MCS field; and determining a resource allocation for the uplink transmission based on the DCI with the time domain resource allocation field and the time domain resource assignment table, determining a MCS for the uplink transmission based on the DCI with the MCS field and some of rows in the MCS table.

In one example, the method, wherein the bitwidth of the MCS field is less than 5 bits.

In one example, the method, wherein the DCI is with Cyclic Redundancy Check (CRC) scrambled by a new Radio Network Temporary Identifier (RNTI) which is introduced for the UE with reduced capability.

In one example, a method by a base station (gNB), comprising: transmitting a radio resource control (RRC) message comprising a time domain resource assignment table, transmitting a RRC message comprising a modulation and coding scheme (MCS) table, determining a resource allocation from the time domain resource assignment table and a MCS from some of rows in the MCS table for an uplink transmission of a user equipment (UE) with reduced capability; and transmitting, to the UE, downlink control information (DCI), wherein the DCI includes a time domain resource assignment field indicating the resource allocation for the uplink transmission and a MCS field indicating the MCS for the uplink transmission.

In one example, the method, wherein the bitwidth of the MCS field is less than 5 bits.

In one example, the method, wherein the DCI is with Cyclic Redundancy Check (CRC) scrambled by a new Radio Network Temporary Identifier (RNTI) which is introduced for the UE with reduced capability.

CROSS REFERENCE

This Nonprovisional application claims priority under 35 U.S.C. § 119 on provisional Application No. 63/025,057 on May 14, 2020, the entire contents of which are hereby incorporated by reference.

What is claimed is:

1. A user equipment (UE) comprising:
receiving circuitry configured to:
receive a radio resource control (RRC) configuration used to configure a reduced capability UE to determine whether how to interpret a bit field for a physical uplink control channel (PUCCH) resource indicator in a downlink control information (DCI) format is used as the PUCCH resource indicator, wherein the DCI format is used for scheduling a physical downlink shared channel (PDSCH), and
receive the DCI format and the PDSCH; and
transmitting circuitry configured to transmit, using a PUCCH, a Hybrid Automatic Repeat Request-Acknowledgment (HARQ-ACK) for the PDSCH in accordance with a reduced capability UE specific procedure.

2. A method performed by a user equipment (UE), the method comprising:
receiving a radio resource control (RRC) configuration used to configure a reduced capability UE to determine whether a bit field for a physical uplink control channel (PUCCH) resource indicator in a downlink control information (DCI) format is used as the PUCCH resource indicator, wherein the DCI format is used for scheduling a physical downlink shared channel (PDSCH);
receiving the DCI format and the PDSCH; and
transmitting, using a PUCCH, a Hybrid Automatic Repeat Request-Acknowledgment (HARQ-ACK) for the PDSCH in accordance with a reduced capability UE specific procedure.

3. A base station comprising:
transmitting circuitry configured to:
transmit a radio resource control (RRC) configuration used to configure a reduced capability user equipment (UE) to determine whether, how to a bit field for a physical uplink control channel (PUCCH) resource indicator in a downlink control information (DCI) format is used as the PUCCH resource indicator, wherein the DCI format is used for scheduling a physical downlink shared channel (PDSCH), and
transmit the DCI format and the PDSCH; and
receiving circuitry configured to receive, using a PUCCH, a Hybrid Automatic Repeat Request-Acknowledgment (HARQ-ACK) for the PDSCH in accordance with a reduced capability UE specific procedure.

4. The UE according to claim 1, wherein
the RRC configuration is a reduced capability UE specific configuration.

5. The base station according to claim 3, wherein
the RRC configuration is a reduced capability UE specific configuration.

* * * * *